United States Patent
Shimezawa

(10) Patent No.: US 11,337,212 B2
(45) Date of Patent: May 17, 2022

(54) COMMUNICATION APPARATUS, COMMUNICATION METHOD, AND RECORDING MEDIUM

(71) Applicant: Sony Corporation, Tokyo (JP)

(72) Inventor: Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 29 days.

(21) Appl. No.: 16/318,774

(22) PCT Filed: Jul. 10, 2017

(86) PCT No.: PCT/JP2017/025069
§ 371 (c)(1),
(2) Date: Jan. 18, 2019

(87) PCT Pub. No.: WO2018/030051
PCT Pub. Date: Feb. 15, 2018

(65) Prior Publication Data
US 2019/0289598 A1    Sep. 19, 2019

(30) Foreign Application Priority Data

Aug. 10, 2016 (JP) .............................. JP2016-157396

(51) Int. Cl.
*H04W 72/04* (2009.01)
*H04L 5/14* (2006.01)
(Continued)

(52) U.S. Cl.
CPC ...... *H04W 72/0446* (2013.01); *H04B 7/2615* (2013.01); *H04L 5/001* (2013.01);
(Continued)

(58) Field of Classification Search
CPC .. H04W 72/0446; H04B 7/2615; H04L 5/001; H04L 5/0026; H04L 5/0051
See application file for complete search history.

(56) References Cited

U.S. PATENT DOCUMENTS

2014/0334403 A1* 11/2014 Park .................... H04L 27/2647
370/329
2014/0362701 A1* 12/2014 Roh ...................... H04L 1/0064
370/235

(Continued)

FOREIGN PATENT DOCUMENTS

CN         103493416 A      1/2014
CN         104641577 A      5/2015
(Continued)

OTHER PUBLICATIONS

3GPP TR 38.913, V0.4.0, Technical Specification Group Radio Access Network. (Jun. 2016) (Year: 2016).*

(Continued)

*Primary Examiner* — Un C Cho
*Assistant Examiner* — Peter K Mak
(74) *Attorney, Agent, or Firm* — Xsensus LLP

(57) ABSTRACT

[Object] To provide a mechanism that enables flexible design in relation to communication timing.
[Solution] A communication apparatus including: a communication control unit that controls transmission of any one of a first channel that is transmitted in a first direction and a second channel that is transmitted in a second direction that faces the first direction and corresponds to the first channel and reception of the other one of the first channel and the second channel; and a setting unit that sets a control mode of the communication control unit to a first mode or a second mode. The communication control unit transmits and receives the first channel and the second channel in different sub frames in the first mode and transmits and receives the first channel and the second channel in a same sub frame in the second mode.

27 Claims, 26 Drawing Sheets

(51) Int. Cl.
    *H04L 27/26* (2006.01)
    *H04B 7/26* (2006.01)
    *H04L 5/00* (2006.01)
(52) U.S. Cl.
    CPC .............. *H04L 5/0055* (2013.01); *H04L 5/14* (2013.01); *H04L 5/0021* (2013.01); *H04L 5/0026* (2013.01); *H04L 5/0051* (2013.01); *H04L 5/0053* (2013.01)

(56) References Cited

U.S. PATENT DOCUMENTS

| | | | | |
|---|---|---|---|---|
| 2015/0023231 | A1* | 1/2015 | Ji | H04W 72/1289 370/280 |
| 2015/0043397 | A1* | 2/2015 | Hsieh | H04L 5/1469 370/280 |
| 2015/0173063 | A1* | 6/2015 | Oizumi | H04L 1/1678 370/242 |
| 2015/0249972 | A1* | 9/2015 | You | H04L 5/0035 370/254 |
| 2015/0249980 | A1* | 9/2015 | You | H04L 5/001 370/329 |
| 2015/0341814 | A1* | 11/2015 | Yu | H04W 24/10 370/252 |
| 2015/0351117 | A1* | 12/2015 | Rahman | H04L 5/1469 370/252 |
| 2015/0373677 | A1* | 12/2015 | Seo | H04W 72/044 370/330 |
| 2016/0014753 | A1* | 1/2016 | Wu | H04B 7/022 370/280 |
| 2016/0037550 | A1* | 2/2016 | Barabell | H04B 17/318 455/450 |
| 2016/0050054 | A1* | 2/2016 | Wager | H04L 5/0035 455/450 |
| 2016/0135240 | A1* | 5/2016 | Yoon | H04W 8/005 370/329 |
| 2016/0143032 | A1* | 5/2016 | Horiuchi | H04W 72/0446 370/329 |
| 2017/0280454 | A1* | 9/2017 | Kusashima | H04L 5/0055 |
| 2018/0102881 | A1* | 4/2018 | Cheng | H04W 72/0446 |
| 2018/0132220 | A1* | 5/2018 | Jang | H04W 8/24 |
| 2018/0139586 | A1* | 5/2018 | Park | H04W 4/06 |
| 2018/0242364 | A1* | 8/2018 | Park | H04W 88/08 |
| 2019/0036676 | A1* | 1/2019 | Takeda | H04W 72/0446 |
| 2019/0069312 | A1* | 2/2019 | Oh | H04W 72/04 |
| 2019/0289605 | A1* | 9/2019 | Futaki | H04L 1/0041 |
| 2019/0387521 | A1* | 12/2019 | Gao | H04L 5/0091 |
| 2020/0314840 | A1* | 10/2020 | Golitschek Edler Von Elbwart | H04L 5/0044 |
| 2020/0322187 | A1* | 10/2020 | He | H04L 5/0055 |

FOREIGN PATENT DOCUMENTS

| | | |
|---|---|---|
| CN | 104782207 A | 7/2015 |
| JP | 2014-220678 A | 11/2014 |

OTHER PUBLICATIONS

3GPP, Technical Specification Group Radio Access Network; Study on Scenarios and Requirements for Next Generation Access Technologies; 3GPP TR 38.913 V0.3.0, Release 14, Mar. 2016, pp. 1-30.

3GPP, "Technical Specification Group Radio Access Network; Evolved Universal Terrestrial Radio Access (E-UTRA); Physical layer procedures", 3GPP TS 36.213 V13.2.0, Release 13, Jun. 2016, pp. 1-381.

Qualcomm Incorporated, "Frame structure requirements", 3GPP TSG RAN WG 1 Meeting # 85 R1-164694, Nanjing China, May 23-27, 2016, pp. 1-5.

Nokia, Alcatel-Lucent Shanghai Bell, "Basic frame structure principles for 5G", 3GPP TSG-RAN WG 1 Meeting # 85 R1-165027, Nanjing China, May 23-27, 2016, 7 pages.

Huawei, Hisilicon, "Discussion on frame structure for NR", 3GPP TSG-RAN WG 1 Meeting # 85 R1-164032 Nanjing China, May 23-27, 2016, 9 pages.

III, "Discussion on frame structure for NR", 3GPP TSG-RAN WG 1 Meeting # 86 R1-167739, Gothenburg Sweden Aug. 22-26, 2016, Institute for Information Industry, 5 pages.

Qualcomm Incorporated, "Frame structure requirements", 3GPP TSG-RAN WG 1 Meeting # 84b R1-162206, Apr. 11-15, 2016, 10 pages.

International Search Report dated Sep. 26, 2017 for PCT/JP2017/025069 filed on Jul. 10, 2017, 9 pages including English translation.

* cited by examiner

FIG. 5

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

COMMUNICATION APPARATUS, COMMUNICATION METHOD, AND RECORDING MEDIUM

CROSS-REFERENCE TO RELATED APPLICATIONS

The present application is based on PCT filing PCT/JP2017/025069, filed 10 Jul. 2017, and claims priority to 2016-157396, filed in the Japanese Patent Office on 10 Aug. 2016, the entire contents of each of which being incorporated herein by reference.

TECHNICAL FIELD

The present disclosure relates to a communication apparatus, a communication method, and a recording medium.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A. LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

Next, retransmission control in a wireless communication system such as LTE or NR will be described. In a case in which a base station device transmits data to a terminal device, for example, the terminal device reports information indicating whether or not the data has properly been received to the base station device. For example, the terminal device transmits acknowledgement (Ack: positive response) to the base station device in a case in which the terminal device has properly received the data, while the terminal device transmits negative acknowledgement (Nack: negative response) to the base station in a case in which the terminal device has not properly received the data. Here, the information indicating whether or not the received data has properly been received is also referred to as HARQ-ACK. The base station device can recognize whether or not the terminal device has properly received the data through reported HARQ-ACK, and in a case in which the terminal device has not properly received the data, the base station device can retransmit the data to the terminal device. Such retransmission control is also referred to as hybrid automatic repeat request (HARQ). Details of retransmission control in LTE is disclosed in Non-Patent Literature 2.

Also, a self-contained (self-completing type) sub frame has been considered as a frame configuration suitable for low latency communication, in particular, for NR. In the self-contained sub frame, for example, one sub frame includes downlink data and uplink HARQ-ACK corresponding to the downlink data. In the self-contained sub frame, one sub frame includes downlink control information and uplink data scheduled for the downlink control information. For example, details of the self-contained sub frame are disclosed in Non-Patent Literature 3.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0. 3.0 (2016-03). <http://www.3gpp.org/ftp/Specs/archive/38_series/38.913/38913-030.zip>

Non-Patent Literature 2: 3rd Generation Partnership Project; Technical Specification Group Radio Access Network; Evolved Universal Terrestrial Radio Access (E-UTRA); Physical layer procedures (Release 13), 3GPP TS 36.213 V13.2.0 (2016-06).

Non-Patent Literature 3: R1-164694, Frame structure requirements, Qualcomm Incorporated, 3GPP TSG RAN WG1 Meeting #85. Nanjing, China, 23-27 May 2016.

DISCLOSURE OF INVENTION

Technical Problem

Since various use cases are flexibly supported in NR, there is a higher probability that transmission signals, frame configurations, channel configurations, and the like are extended than LTE. However. NR is still being studied, and it is difficult to state that technologies for supporting various assumed use cases have sufficiently been proposed. For example, a technology for supporting various use cases in relation to timings of communication performed between communication apparatuses is also one of the technologies that have not sufficiently been proposed.

Thus, the present disclosure provides a mechanism that enables flexible design in relation to communication timing.

Solution to Problem

According to the present disclosure, there is provided a communication apparatus including: a communication control unit that controls transmission of any one of a first channel that is transmitted in a first direction and a second channel that is transmitted in a second direction that faces the first direction and corresponds to the first channel and reception of the other one of the first channel and the second channel; and a setting unit that sets a control mode of the communication control unit to a first mode or a second mode. The communication control unit transmits and receives the first channel and the second channel in different sub frames in the first mode and transmits and receives the first channel and the second channel in a same sub frame in the second mode.

In addition, according to the present disclosure, there is provided a communication method including: controlling, by a processor, transmission of any one of a first channel that is transmitted in a first direction and a second channel that is transmitted in a second direction that faces the first direction and corresponds to the first channel and reception of the other one of the first channel and the second channel; and setting a control mode to a first mode or a second mode. The controlling of the transmission and the reception includes transmitting and receiving the first channel and the second channel in different sub frames in the first mode and transmitting and receiving the first channel and the second channel in a same sub frame in the second mode.

In addition, according to the present disclosure, there is provided a recording medium having a program recorded thereon, the program causing a computer to function as: a communication control unit that controls transmission of any one of a first channel that is transmitted in a first direction and a second channel that is transmitted in a second direction that faces the first direction and corresponds to the first channel and reception of the other one of the first channel and the second channel; and a setting unit that sets a control mode of the communication control unit to a first mode or a second mode. The communication control unit transmits and receives the first channel and the second channel in different sub frames in the first mode and transmits and receives the first channel and the second channel in a same sub frame in the second mode.

Advantageous Effects of Invention

According to the present disclosure, a mechanism that enables flexible design in relation to communication timing is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating examples of parameter sets related to a transmission signal in an NR cell.

MODE(S) FOR CARRYING OUT THE INVENTION

Figure 1:
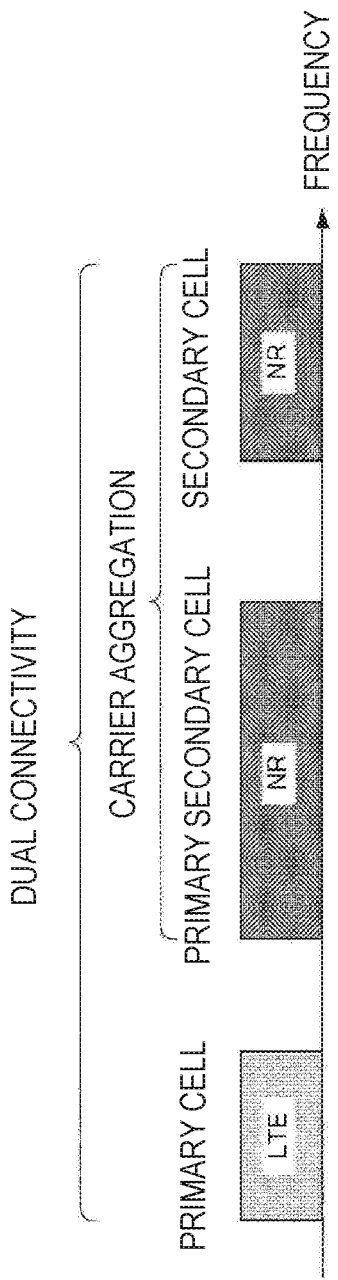
FIG. 1 is a diagram illustrating an example of setting of a component carrier according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted. Further, technologies, functions, methods, configurations, and procedures to be described below and all other descriptions can be applied to LTE and NR unless particularly stated otherwise.

Note that description will be performed in the following order.

1. Introduction
2. Technical features
2.1. Configuration example of higher layer processing unit
2.2. NR frame configuration
2.3. Timing control
2.4. Details of PUCCH configuration
2.5. Supplementary note
3. Application examples
4. Conclusion <<1. Introduction>>

First, background technologies of an embodiment of the present disclosure will be described.

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S1-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

The base station device 1 and the terminal device 2 can support communication in which a set of one or more cells is used in a downlink, an uplink, and/or a sidelink. A set of a plurality of cells is also referred to as carrier aggregation or dual connectivity. The details of the carrier aggregation and the dual connectivity will be described below. Further, each cell uses a predetermined frequency bandwidth. A maximum value, a minimum value, and a settable value in the predetermined frequency bandwidth can be specified in advance.

FIG. 1 is a diagram illustrating an example of setting of a component carrier according to the present embodiment. In the example of FIG. 1, one LTE cell and two NR cells are set. One LTE cell is set as a primary cell. Two NR cells are set as a primary and secondary cell and a secondary cell. Two NR cells are integrated by the carrier aggregation. Further, the LTE cell and the NR cell are integrated by the dual connectivity. Note that the LTE cell and the NR cell may be integrated by carrier aggregation. In the example of FIG. 1, NR may not support some functions such as a function of performing standalone communication since connection can be assisted by an LTE cell which is a primary cell. The function of performing standalone communication includes a function necessary for initial connection.

Figure 2:
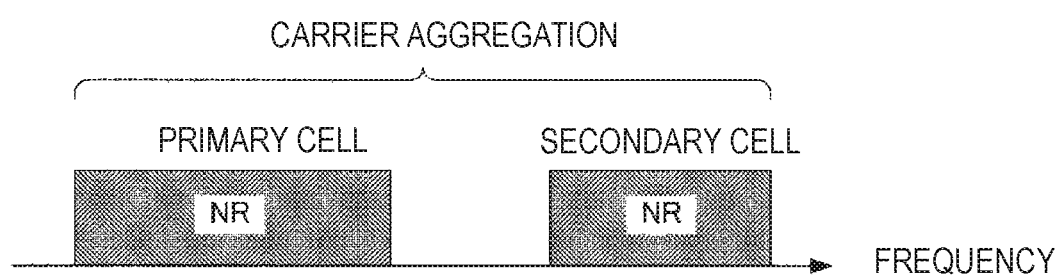
FIG. 2 is a diagram illustrating an example of setting of a component carrier according to the present embodiment.

FIG. 2 is a diagram illustrating an example of setting of a component carrier according to the present embodiment. In the example of FIG. 2, two NR cells are set. The two NR cells are set as a primary cell and a secondary cell, respectively, and are integrated by carrier aggregation. In this case, when the NR cell supports the function of performing standalone communication, assist of the LTE cell is not necessary. Note that the two NR cells may be integrated by dual connectivity.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 sub frames. The time interval of the sub frame is 1 ms and is defined by two successive slots. The time interval of the slot is 0.5 ms. An i-th sub frame in the radio frame includes a (2×i)-th slot and a (2×i+1)-th slot. In other words. 10 sub frames are specified in each of the radio frames.

Sub frames include a downlink sub frame, an uplink sub frame, a special sub frame, a sidelink sub frame, and the like.

The downlink sub frame is a sub frame reserved for downlink transmission. The uplink sub frame is a sub frame reserved for uplink transmission. The special sub frame includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special sub frame may include only the DwPTS and the GP or may include only the GP and the UpPTS. The special sub frame is placed between the downlink sub frame and the uplink sub frame in time division duplex (TDD) and used to perform switching from the downlink sub frame to the uplink sub frame. The sidelink sub frame is a sub frame reserved or set for sidelink communication. The sidelink is used for contiguous direct communication and contiguous direct detection between terminal devices.

A single radio frame includes a downlink sub frame, an uplink sub frame, a special sub frame, and/or a sidelink sub frame. Further, a single radio frame includes only a downlink sub frame, an uplink sub frame, a special sub frame, or a sidelink sub frame.

A plurality of radio frame configurations is supported. The radio frame configuration is specified by the frame configuration type. The frame configuration type 1 can be applied only to frequency division duplex (FDD). The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 sub frames in one radio frame corresponds to one of the downlink sub frame, the uplink sub frame, and the special sub frame. The sub frame 0, the sub frame 5 and the DwPTS are constantly reserved for downlink transmission. The UpPTS and the sub frame just after the special sub frame are constantly reserved for uplink transmission.

In the frame configuration type 3, 10 sub frames in one radio frame are reserved for downlink transmission. The terminal device 2 treats a sub frame by which PDSCH or a detection signal is not transmitted, as an empty sub frame. Unless a predetermined signal, channel and/or downlink transmission is detected in a certain sub frame, the terminal device 2 assumes that there is no signal and/or channel in the sub frame. The downlink transmission is exclusively occupied by one or more consecutive sub frames. The first sub frame of the downlink transmission may be started from any one in that sub frame. The last sub frame of the downlink transmission may be either completely exclusively occupied or exclusively occupied by a time interval specified in the DwPTS.

Further, in the frame configuration type 3, 10 sub frames in one radio frame may be reserved for uplink transmission. Further, each of 10 sub frames in one radio frame may correspond to any one of the downlink sub frame, the uplink sub frame, the special sub frame, and the sidelink sub frame.

The base station device 1 may transmit a downlink physical channel and a downlink physical signal in the DwPTS of the special sub frame. The base station device 1 can restrict transmission of the PBCH in the DwPTS of the special sub frame. The terminal device 2 may transmit uplink physical channels and uplink physical signals in the UpPTS of the special sub frame. The terminal device 2 can restrict transmission of some of the uplink physical channels and the uplink physical signals in the UpPTS of the special sub frame.

Note that a time interval in single transmission is referred to as a transmission time interval (TTI) and 1 ms (1 sub frame) is defined as 1 TTI in LTE.

<Frame Configuration of LTE in Present Embodiment>

Figure 3:
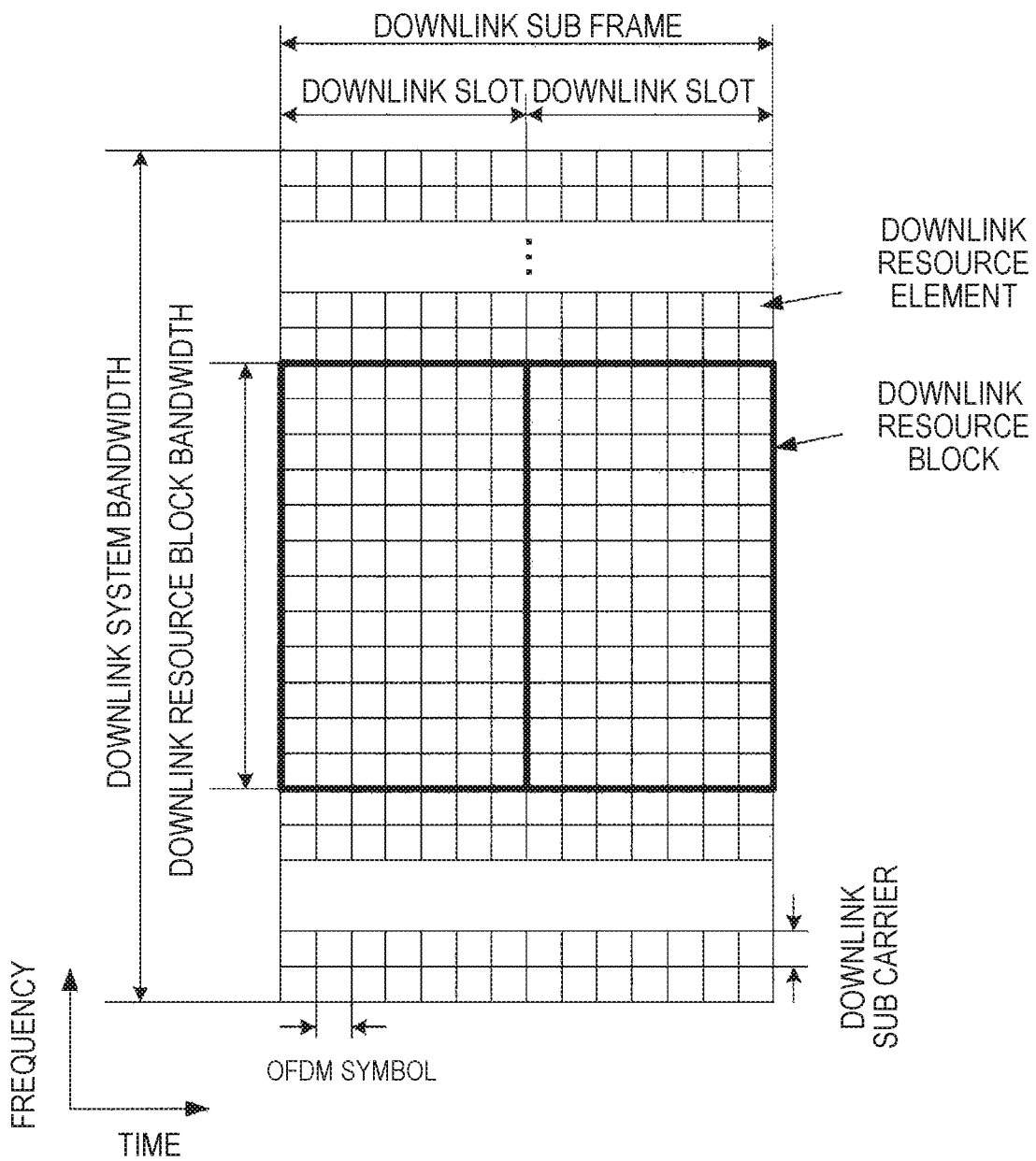
FIG. 3 is a diagram illustrating an example of a downlink sub frame of LTE according to the present embodiment.

FIG. 3 is a diagram illustrating an example of a downlink sub frame of LTE according to the present embodiment. The diagram illustrated in FIG. 3 is referred to as a downlink resource grid of LTE. The base station device 1 can transmit a downlink physical channel of LTE and/or a downlink physical signal of LTE in a downlink sub frame to the terminal device 2. The terminal device 2 can receive a downlink physical channel of LTE and/or a downlink physical signal of LTE in a downlink sub frame from the base station device 1.

Figure 4:
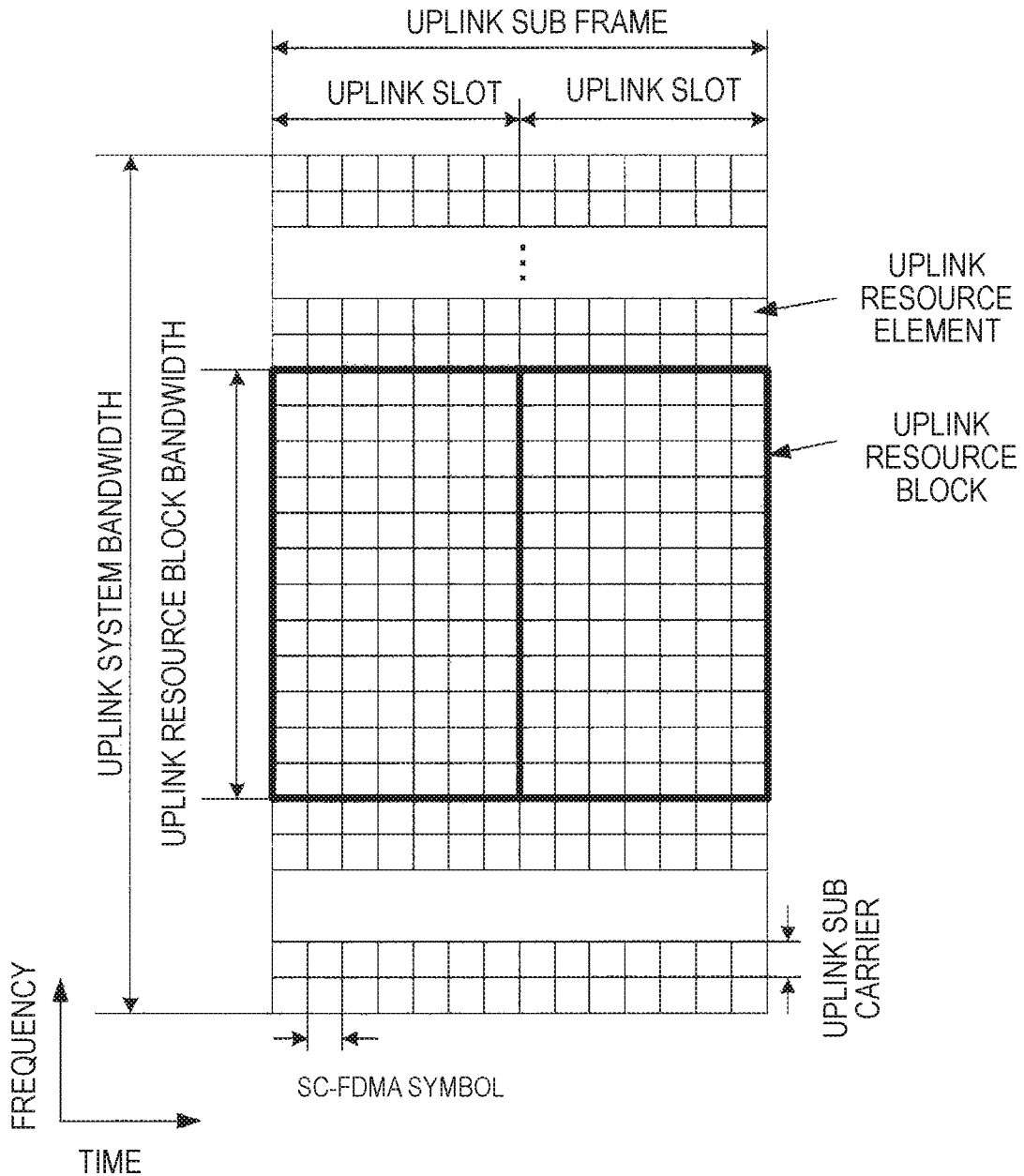
FIG. 4 is a diagram illustrating an example of an uplink sub frame of LTE according to the present embodiment.

FIG. 4 is a diagram illustrating an example of an uplink sub frame of LTE according to the present embodiment. The diagram illustrated in FIG. 4 is referred to as an uplink resource grid of LTE. The terminal device 2 can transmit an uplink physical channel of LTE and/or an uplink physical signal of LTE in an uplink sub frame to the base station device 1. The base station device 1 can receive an uplink physical channel of LTE and/or an uplink physical signal of LTE in an uplink sub frame from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of sub carriers in a frequency direction and a plurality of OFDM symbols in a time direction. In the uplink, the resource grid is defined by a plurality of sub carriers in the frequency direction and a plurality of SC-FDMA symbols in the time direction. The number of sub carriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a sub carrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive sub carriers in the frequency domain. The number of symbols and the number of sub carriers in one physical resource block are decided on the basis of a parameter set in accordance with a type of CP, a sub carrier interval, and/or a higher layer in the cell. For example, in a case in which the type of CP is the normal CP, and the sub carrier interval is 15 kHz, the number of symbols in one physical resource block is 7, and the number of sub carriers is 12. In this case, one physical resource block includes (7×12) resource elements. The physical resource blocks are numbered from 0 in the frequency domain. Further, two resource blocks in one sub frame corresponding to the same physical resource block number are defined as a physical resource block pair (a PRB pair or an RB pair).

In each LTE cell, one predetermined parameter is used in a certain sub frame. For example, the predetermined parameter is a parameter (physical parameter) related to a transmission signal. Parameters related to the transmission signal include a CP length, a sub carrier interval, the number of symbols in one sub frame (predetermined time length), the number of sub carriers in one resource block (predetermined frequency band), a multiple access scheme, a signal waveform, and the like.

That is, in the LTE cell, a downlink signal and an uplink signal are each generated using one predetermined parameter in a predetermined time length (for example, a sub frame). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a sub frame). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SDM).

In a combination of the predetermined parameters set in the NR cell, a plurality of kinds of parameter sets can be specified in advance.

FIG. 5 is a diagram illustrating examples of the parameter sets related to a transmission signal in the NR cell. In the example of FIG. 5, parameters of the transmission signal included in the parameter sets include a sub carrier interval, the number of sub carriers per resource block in the NR cell, the number of symbols per sub frame, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 6:
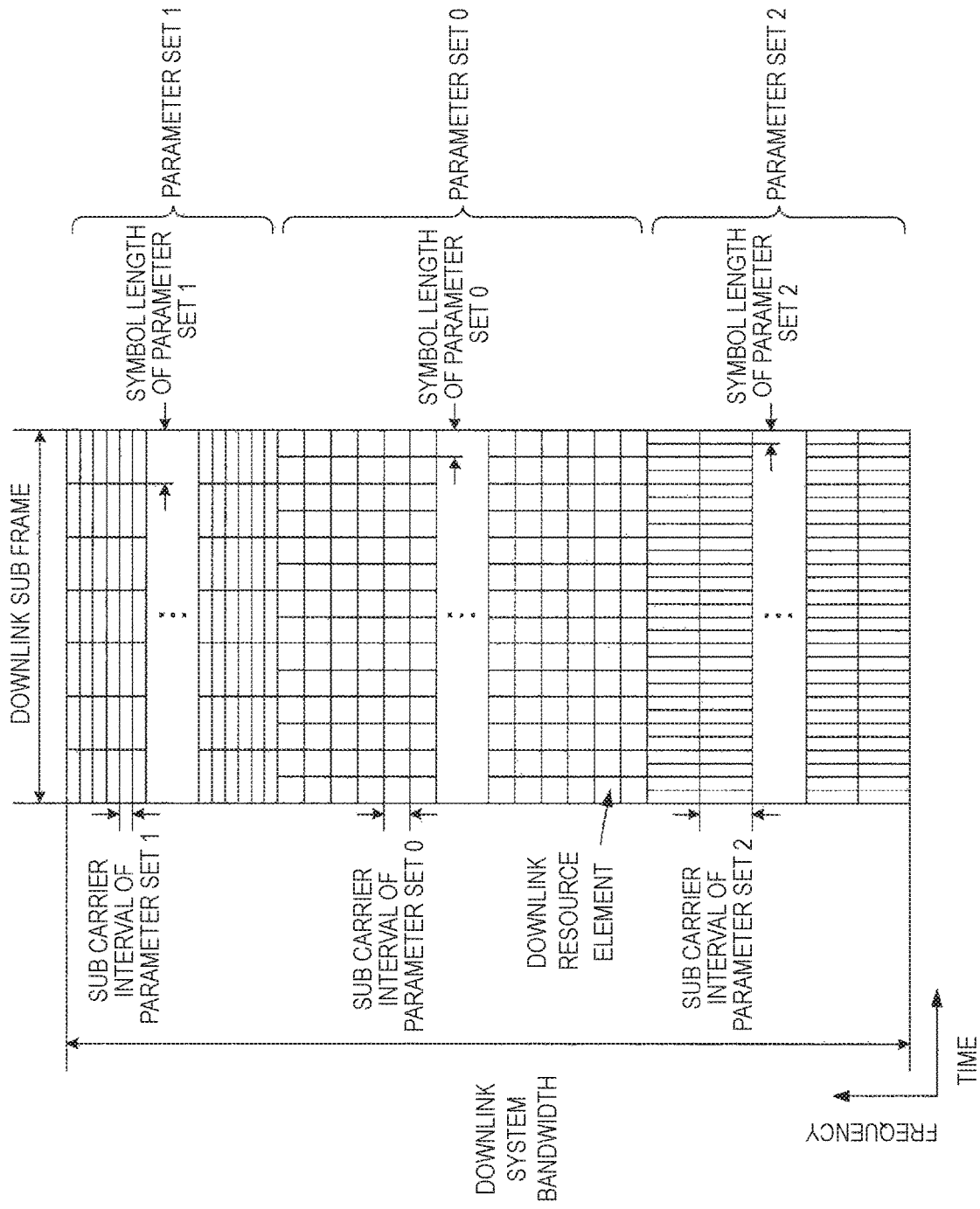
FIG. 6 is a diagram illustrating an example of an NR downlink sub frame of the present embodiment.

FIG. 6 is a diagram illustrating an example of an NR downlink sub frame of the present embodiment. In the example of FIG. 6, signals generated using parameter set 1, parameter set 0, and parameter set 2 are subjected to FDM in a cell (system bandwidth). The diagram illustrated in FIG. 6 is also referred to as a downlink resource grid of NR. The base station device 1 can transmit the downlink physical channel of NR and/or the downlink physical signal of NR in a downlink sub frame to the terminal device 2. The terminal device 2 can receive a downlink physical channel of NR and/or the downlink physical signal of NR in a downlink sub frame from the base station device 1.

Figure 7:
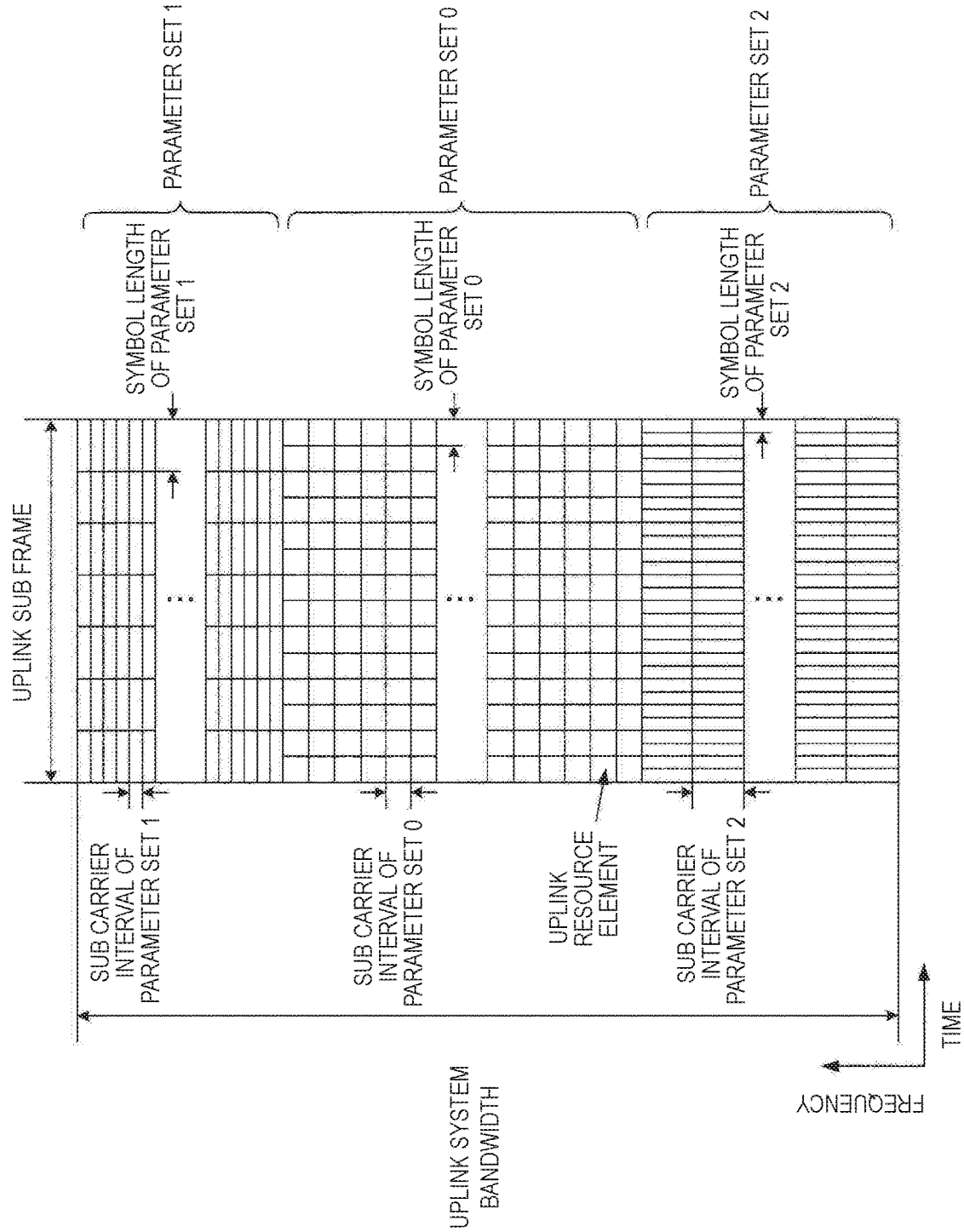
FIG. 7 is a diagram illustrating an example of an NR uplink sub frame of the present embodiment.

FIG. 7 is a diagram illustrating an example of an NR uplink sub frame of the present embodiment. In the example of FIG. 7, signals generated using parameter set 1, parameter set 0, and parameter set 2 are subjected to FDM in a cell (system bandwidth). The diagram illustrated in FIG. 6 is also referred to as an uplink resource grid of NR. The base station device 1 can transmit the uplink physical channel of NR and/or the uplink physical signal of NR in an uplink sub frame to the terminal device 2. The terminal device 2 can receive an uplink physical channel of NR and/or the uplink physical signal of NR in an uplink sub frame from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a downlink physical channel, an uplink physical channel, and a sidelink physical channel. The physical signals include a downlink physical signal, an uplink physical signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

<NR Physical Channel and NR Physical Signal in Present Embodiment>

In LTE, the description of the physical channel and the physical signal can also be applied to the NR physical channel and the NR physical signal, respectively. The NR physical channel and the NR physical signal are referred to as the following.

The NR downlink physical channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR downlink physical signal includes an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR uplink physical channel includes an NR-PUSCH, an NR-PUCCH, an NR-PRACH, and the like.

The NR uplink physical signal includes an NR-UL-RS. The NR-UL-RS includes an NR-UL-DMRS, an NR-SRS, and the like.

The NR sidelink physical channel includes an NR-PSBCH, an NR-PSCCH, an NR-PSDCH, an NR-PSSCH, and the like.

<Downlink Physical Channel in Present Embodiment>

The PBCH is used to broadcast a master information block (MIB) which is broadcast information specific to a serving cell of the base station device 1. The PBCH is transmitted only through the sub frame 0 in the radio frame. The MIB can be updated at intervals of 40 ms. The PBCH is repeatedly transmitted with a cycle of 10 ms. Specifically, initial transmission of the MIB is performed in the sub frame 0 in the radio frame satisfying a condition that a remainder obtained by dividing a system frame number (SFN) by 4 is 0, and retransmission (repetition) of the MIB is performed in the sub frame 0 in all the other radio frames. The SFN is a radio frame number (system frame number). The MIB is system information. For example, the MIB includes information indicating the SFN.

The PHICH is used to transmit an HARQ-ACK (an HARQ indicator, HARQ feedback, and response information) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received by the terminal device 2, corresponding uplink data is not retransmitted. For example, in a case in which the terminal device 2 receives the HARQ-ACK indicating NACK, the terminal device 2 retransmits corresponding uplink data through a predetermined uplink sub frame. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same sub frame as a sub frame in which the downlink grant is transmitted. The uplink grant is used for scheduling of the PUSCH in a certain cell. The uplink grant is used for scheduling of a single PUSCH in a fourth sub frame from a sub frame in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

<Downlink Physical Signal in Present Embodiment>

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a sub frame and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single sub frame or two sub frames. A plurality of PRACHs may be code-multiplexed.

<Configuration Example of Base Station Device 1 in Present Embodiment>

Figure 8:
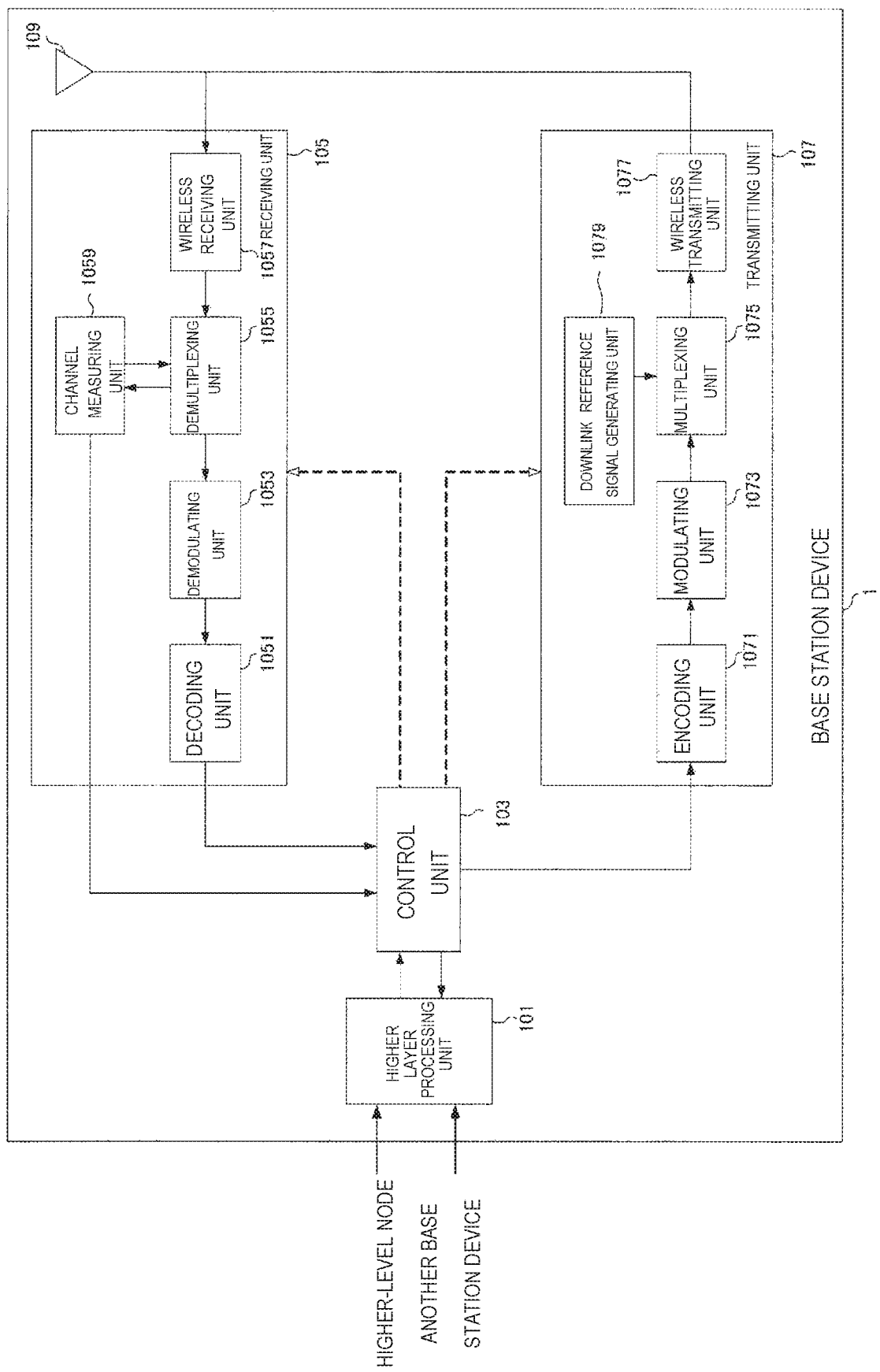
FIG. 8 is a schematic block diagram illustrating a configuration of a base station device of the present embodiment.

FIG. 8 is a schematic block diagram illustrating a configuration of the base station device 1 of the present embodiment. As illustrated in FIG. 3, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 8 can be configured individually in accordance with the RAT. For example, the receiving unit 105 and the transmitting unit 107 are configured individually in LTE and NR. Further, in the NR cell, some or all of the units included in the base station device 1 illustrated in FIG. 8 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, sub frame setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a sub frame setting in the higher layer processing unit 101, management of a sub frame setting, a sub frame pattern setting, an uplink-downlink setting, an uplink reference UL-DL setting, and/or a downlink reference UL-DL setting is performed. Further, the sub frame setting in the higher layer processing unit 101 is also referred to as a base station sub frame setting. Further, the sub frame setting in the higher layer processing unit 101 can be decided on the basis of an uplink traffic volume and a downlink traffic volume. Further, the sub frame setting in the higher layer processing unit 101 can be decided on the basis of a scheduling result of scheduling control in the higher layer processing unit 101.

In the scheduling control in the higher layer processing unit 101, a frequency and a sub frame to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDSCH, and the downlink reference signal and generates a transmission signal. Further, the transmission process in the transmitting unit 107 is performed on the basis of a setting which is specified in advance, a setting notified from the base station device 1 to the terminal device 2, or a setting notified through the PDCCH or the EPDCCH transmitted through the same sub frame.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK. QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Terminal Device 2 in Present Embodiment>

Figure 9:
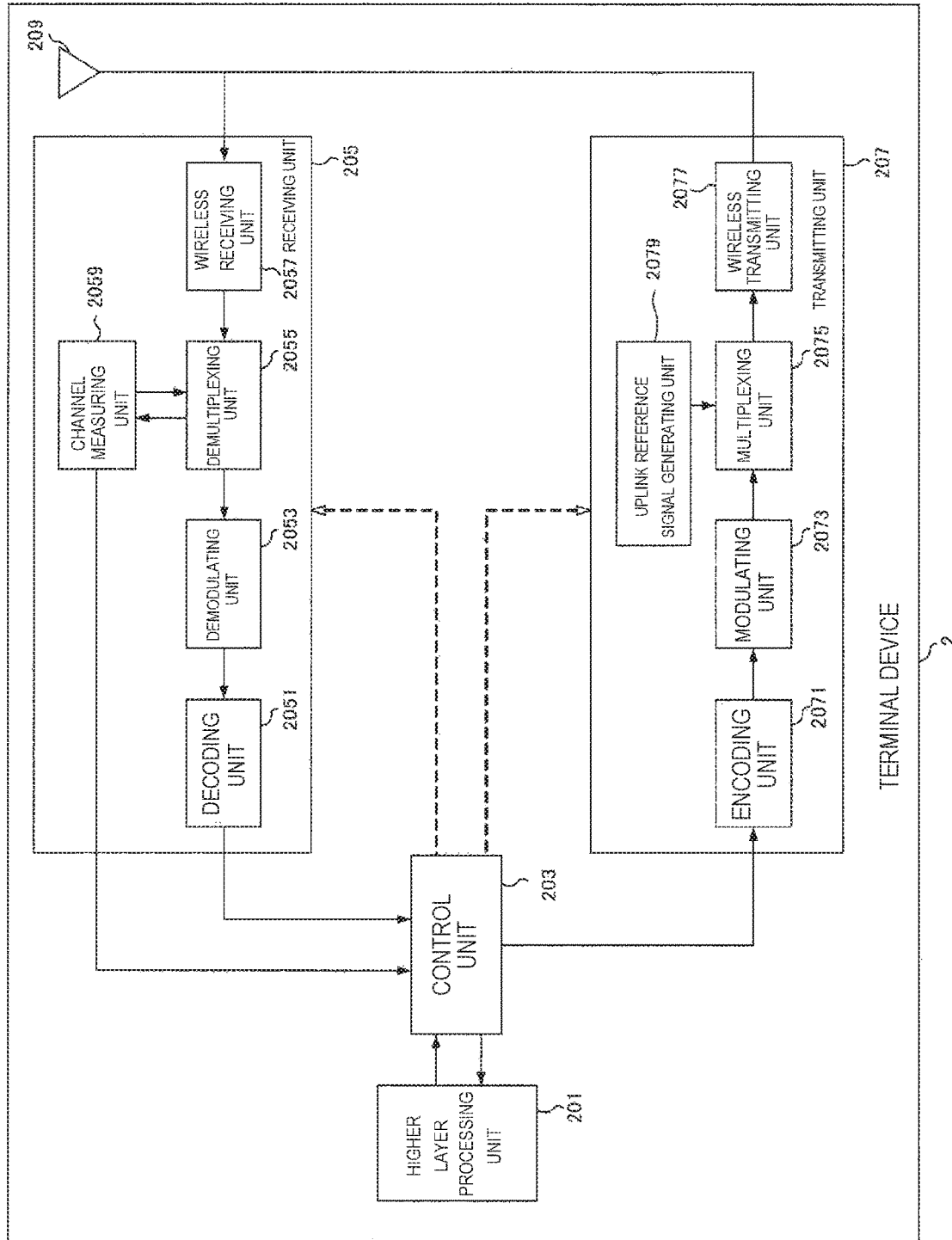
FIG. 9 is a schematic block diagram illustrating a configuration of a terminal device of the present embodiment.

FIG. 9 is a schematic block diagram illustrating a configuration of the terminal device 2 of the present embodiment. As illustrated in FIG. 4, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 9 can be configured individually in accordance with the RAT. For example, the receiving unit 205 and the transmitting unit 207 are configured individually in LTE and NR Further, in the NR cell, some or all of the units included in the terminal device 2 illustrated in FIG. 9 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, sub frame setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the sub frame setting in the higher layer processing unit 201, the sub frame setting in the base station device 1 and/or a base station device different from the base station device 1 is managed. The sub frame setting includes an uplink or downlink setting for the sub frame, a sub frame pattern setting, an uplink-downlink setting, an uplink reference UL-DL setting, and/or a downlink reference UL-DL setting. Further, the sub frame setting in the higher layer processing unit 201 is also referred to as a terminal sub frame setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MIMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDCCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK. QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal, quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

<Details of CA and DC in Present Embodiment>

A plurality of cells is set for the terminal device 2, and the terminal device 2 can perform multicarrier transmission. Communication in which the terminal device 2 uses a plurality of cells is referred to as carrier aggregation (CA) or dual connectivity (DC). Contents described in the present embodiment can be applied to each or some of a plurality of cells set in the terminal device 2. The cell set in the terminal device 2 is also referred to as a serving cell.

In the CA, a plurality of serving cells to be set includes one primary cell (PCell) and one or more secondary cells (SCell). One primary cell and one or more secondary cells can be set in the terminal device 2 that supports the CA.

The primary cell is a serving cell in which the initial connection establishment procedure is performed, a serving cell that the initial connection re-establishment procedure is started, or a cell indicated as the primary cell in a handover procedure. The primary cell operates with a primary frequency. The secondary cell can be set after a connection is constructed or reconstructed. The secondary cell operates with a secondary frequency. Further, the connection is also referred to as an RRC connection.

The DC is an operation in which a predetermined terminal device 2 consumes radio resources provided from at least two different network points. The network point is a master base station device (a master eNB (MeNB)) and a secondary base station device (a secondary eNB (SeNB)). In the dual connectivity, the terminal device 2 establishes an RRC connection through at least two network points. In the dual connectivity, the two network points may be connected through a non-ideal backhaul.

In the DC, the base station device 1 which is connected to at least an S1-MME and plays a role of a mobility anchor of a core network is referred to as a master base station device. Further, the base station device 1 which is not the master base station device providing additional radio resources to the terminal device 2 is referred to as a secondary base station device. A group of serving cells associated with the master base station device is also referred to as a master cell group (MCG). A group of serving cells associated with the secondary base station device is also referred to as a secondary cell group (SCG). Note that the group of the serving cells is also referred to as a cell group (CG).

In the DC, the primary cell belongs to the MCG Further, in the SCG the secondary cell corresponding to the primary cell is referred to as a primary secondary cell (PSCell). A function (capability and performance) equivalent to the PCell (the base station device constituting the PCell) may be supported by the PSCell (the base station device constituting the PSCell). Further, the PSCell may only support some functions of the PCell. For example, the PSCell may support a function of performing the PDCCH transmission using the search space different from the CSS or the USS. Further, the PSCell may constantly be in an activation state. Further, the PSCell is a cell that can receive the PUCCH.

In the DC, a radio bearer (a date radio bearer (DRB)) and/or a signaling radio bearer (SRB) may be individually allocated through the MeNB and the SeNB. A duplex mode may be set individually in each of the MCG (PCell) and the SCG (PSCell). The MCG (PCell) and the SCG (PSCell) may not be synchronized with each other. That is, a frame boundary of the MCG and a frame boundary of the SCG may not be matched. A parameter (a timing advance group (TAG)) for adjusting a plurality of timings may be independently set in the MCG (PCell) and the SCG (PSCell). In the dual connectivity, the terminal device 2 transmits the UCI corresponding to the cell in the MCG only through MeNB (PCell) and transmits the UCI corresponding to the cell in the SCG only through SeNB (pSCell). In the transmission of each UCI, the transmission method using the PUCCH and/or the PUSCH is applied in each cell group.

The PUCCH and the PBCH (MIB) are transmitted only through the PCell or the PSCell. Further, the PRACH is transmitted only through the PCell or the PSCell as long as a plurality of TAGs is not set between cells in the CG.

In the PCell or the PSCell, semi-persistent scheduling (SPS) or discontinuous transmission (DRX) may be performed. In the secondary cell, the same DRX as the PCell or the PSCell in the same cell group may be performed.

In the secondary cell, information/parameter related to a setting of MAC is basically shared with the PCell or the PSCell in the same cell group. Some parameters may be set for each secondary cell. Some timers or counters may be applied only to the PCell or the PSCell.

In the CA, a cell to which the TDD scheme is applied and a cell to which the FDD scheme is applied may be aggregated. In a case in which the cell to which the TDD is applied and the cell to which the FDD is applied are aggregated, the present disclosure can be applied to either the cell to which the TDD is applied or the cell to which the FDD is applied.

The terminal device 2 transmits information (supportedBandCombination) indicating a combination of bands in which the CA and/or DC is supported by the terminal device 2 to the base station device 1. The terminal device 2 transmits information indicating whether or not simultaneous transmission and reception are supported in a plurality of serving cells in a plurality of different bands for each of band combinations to the base station device 1.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi sub frame scheduling, and cross sub frame scheduling.

In the dynamic scheduling, one DCI performs resource allocation in one sub frame. Specifically, the PDCCH or the EPDCCH in a certain sub frame performs scheduling for the PDSCH in the sub frame. The PDCCH or the EPDCCH in a certain sub frame performs scheduling for the PUSCH in a predetermined sub frame after the certain sub frame.

In the multi sub frame scheduling, one DCI allocates resources in one or more sub frames. Specifically, the PDCCH or the EPDCCH in a certain sub frame performs scheduling for the PDSCH in one or more sub frames which are a predetermined number after the certain sub frame. The PDCCH or the EPDCCH in a certain sub frame performs scheduling for the PUSCH in one or more sub frames which are a predetermined number after the sub frame. The predetermined number can be set to an integer of zero or more. The predetermined number may be specified in advance and may be decided on the basis of the signaling of the physical layer and/or the RRC signaling. In the multi sub frame scheduling, consecutive sub frames may be scheduled, or sub frames with a predetermined period may be scheduled. The number of sub frames to be scheduled may be specified in advance or may be decided on the basis of the signaling of the physical layer and/or the RRC signaling.

In the cross sub frame scheduling, one DCI allocates resources in one sub frame. Specifically, the PDCCH or the EPDCCH in a certain sub frame performs scheduling for the PDSCH in one sub frame which is a predetermined number after the certain sub frame. The PDCCH or the EPDCCH in a certain sub frame performs scheduling for the PUSCH in one sub frame which is a predetermined number after the sub frame. The predetermined number can be set to an integer of zero or more. The predetermined number may be specified in advance and may be decided on the basis of the signaling of the physical layer and/or the RRC signaling. In the cross sub frame scheduling, consecutive sub frames may be scheduled, or sub frames with a predetermined period may be scheduled.

In the semi-persistent scheduling (SPS), one DCI allocates resources in one or more sub frames. In a case in which information related to the SPS is set through the RRC signaling, and the PDCCH or the EPDCCH for activating the SPS is detected, the terminal device 2 activates a process related to the SPS and receives a predetermined PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PDU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink sub frame. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK. NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Figure 10:
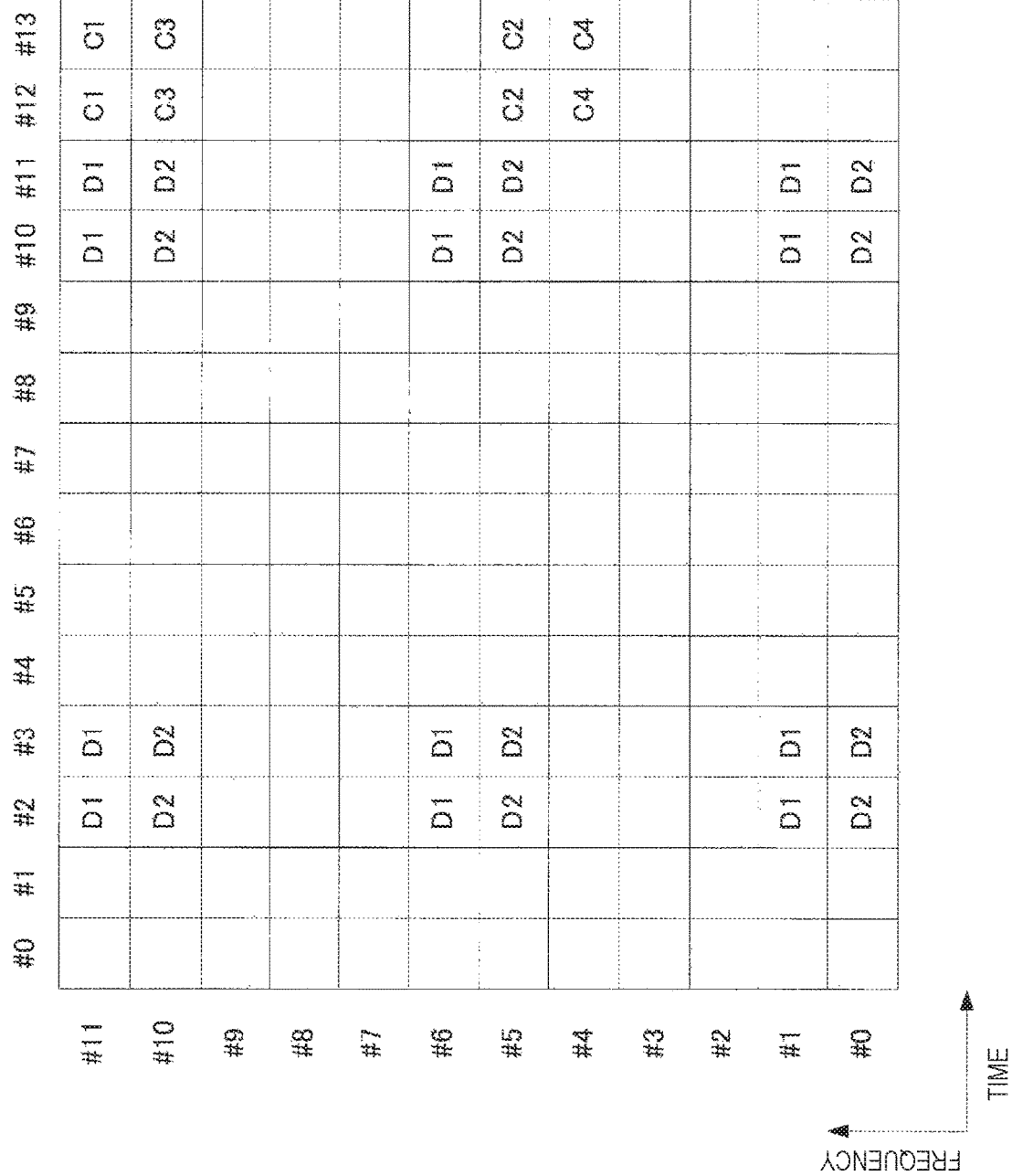
FIG. 10 is a diagram illustrating an example of downlink resource element mapping of NR according to the present embodiment.

FIG. 10 is a diagram illustrating an example of the downlink resource element mapping of NR according to the present embodiment. FIG. 10 illustrates a set of resource elements in the predetermined resources in a case in which parameter set 0 is used. The predetermined resources illustrated in FIG. 10 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 10, the predetermined resources include 14 OFDM symbols indicated by OFDM symbol numbers 0 to 13 in the time direction and 12 sub carriers indicated by sub carrier numbers 0 to 11 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 11:
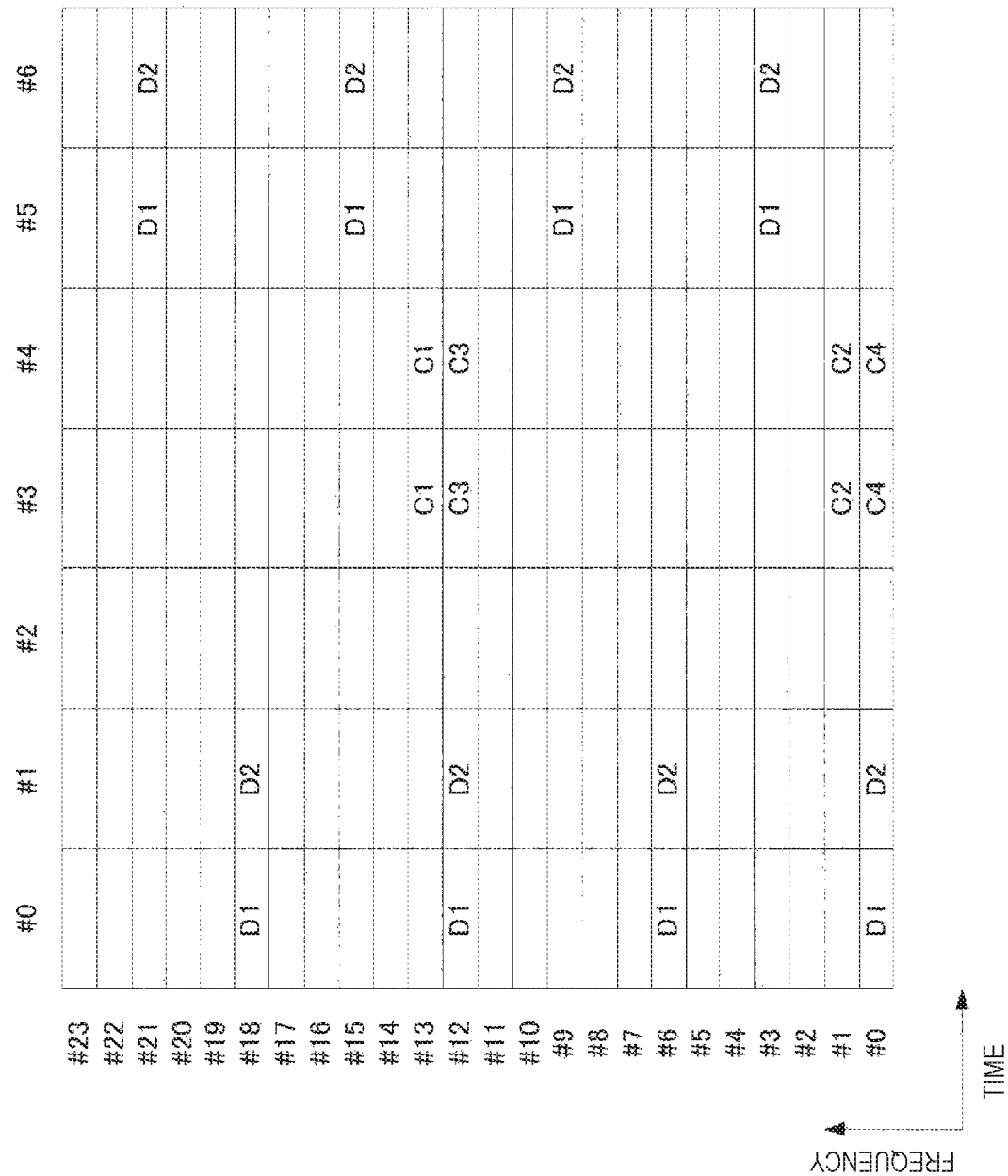
FIG. 11 is a diagram illustrating an example of downlink resource element mapping of NR according to the present embodiment.

FIG. 11 is a diagram illustrating an example of the downlink resource element mapping of NR according to the present embodiment. FIG. 11 illustrates a set of resource elements in the predetermined resources in a case in which parameter set 1 is used. The predetermined resources illustrated in FIG. 11 are resources formed by the same time length and frequency bandwidth as one resource block pair in LTE.

In the example of FIG. 11, the predetermined resources include 7 OFDM symbols indicated by OFDM symbol numbers 0 to 6 in the time direction and 24 sub carriers indicated by sub carrier numbers 0 to 23 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 12:
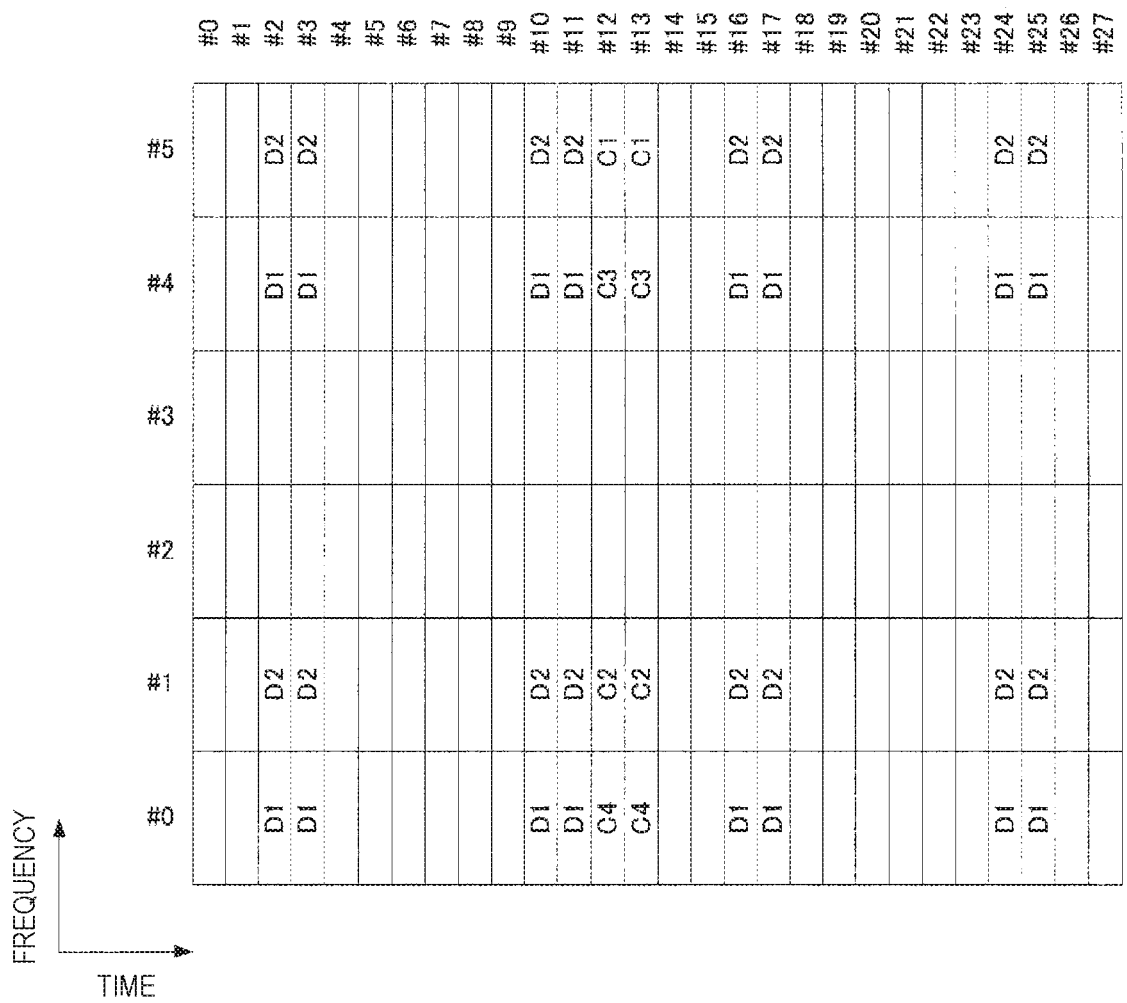
FIG. 12 is a diagram illustrating an example of downlink resource element mapping of NR according to the present embodiment.

FIG. 12 is a diagram illustrating an example of the downlink resource element mapping of NR according to the present embodiment. FIG. 12 illustrates a set of resource elements in the predetermined resources in a case in which parameter set 1 is used. The predetermined resources illustrated in FIG. 12 are resources formed by the same time length and frequency bandwidth as one resource block pair in LTE.

In the example of FIG. 12, the predetermined resources include 28 OFDM symbols indicated by OFDM symbol numbers 0 to 27 in the time direction and 6 sub carriers indicated by sub carrier numbers 0 to 6 in the frequency direction. In a case in which the system bandwidth includes the plurality of predetermined resources, sub carrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Frame Configuration of NR in Present Embodiment>

Figure 13:
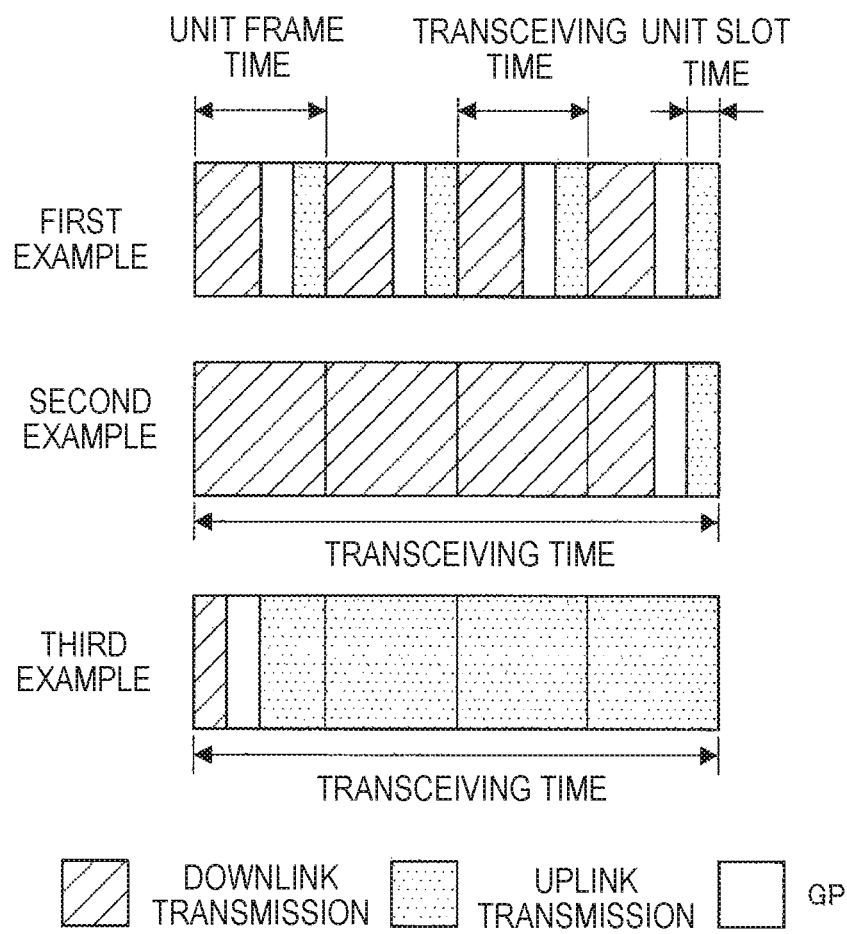
FIG. 13 is a diagram illustrating an example of a frame configuration of a self-contained transmission according to the present embodiment.

In NR, a physical channel and/or a physical signal can be transmitted by self-contained transmission. FIG. 13 illustrates an example of a frame configuration of the self-contained transmission in the present embodiment. In the self-contained transmission, single transceiving includes successive downlink transmission, a GP, and successive downlink transmission from the head in this order. The successive downlink transmission includes at least one piece of downlink control information and the DMRS. The downlink control information gives an instruction to receive a downlink physical channel included in the successive downlink transmission and to transmit an uplink physical channel included in the successive uplink transmission. In a case in which the downlink control information gives an instruction to receive the downlink physical channel, the terminal device 2 attempts to receive the downlink physical channel on the basis of the downlink control information. Then, the terminal device 2 transmits success or failure of reception of the downlink physical channel (decoding success or failure) by an uplink control channel included in the uplink transmission allocated after the GP. On the other hand, in a case in which the downlink control information gives an instruction to transmit the uplink physical channel, the uplink physical channel transmitted on the basis of the downlink control information is included in the uplink transmission to be transmitted. In this way, by flexibly switching between transmission of uplink data and transmission of downlink data by the downlink control information, it is possible to take countermeasures instantaneously to increase or decrease a traffic ratio between an uplink and a downlink. Further, by notifying of the success or failure of the reception of the downlink by the uplink transmission immediately after the success or failure of reception of the downlink, it is possible to realize low-delay communication of the downlink.

A unit slot time is a minimum time unit in which downlink transmission, a GP, or uplink transmission is defined. The unit slot time is reserved for one of the downlink transmission, the GP, and the uplink transmission. In the unit slot time, neither the downlink transmission nor the uplink transmission is included. The unit slot time may be a minimum transmission time of a channel associated with the DMRS included in the unit slot time. One unit slot time is defined as, for example, an integer multiple of a sampling interval ($T_s$) or the symbol length of NR.

The unit frame time may be a minimum time designated by scheduling. The unit frame time may be a minimum unit in which a transport block is transmitted. The unit slot time may be a maximum transmission time of a channel associated with the DMRS included in the unit slot time. The unit frame time may be a unit time in which the uplink transmission power in the terminal device 2 is decided. The unit frame time may be referred to as a sub frame. In the unit frame time, there are three types of only the downlink transmission, only the uplink transmission, and a combination of the uplink transmission and the downlink transmission. One unit frame time is defined as, for example, an integer multiple of the sampling interval ($T_s$), the symbol length, or the unit slot time of NR.

A transceiving time is one transceiving time. An interval between one transceiving and another transceiving is occupied by a time (gap) in which neither a physical channel nor a physical signal is transmitted. It is not preferable for the terminal device 2 to average CSI measurements between different transceivings. The transceiving time is also referred to as a TTI. One transceiving time is defined as, for example, an integer multiple of a sampling interval ($T_s$), a symbol length, a unit slot time, or a unit frame time of NR.

<Non-Orthogonal Multiple Access (NOMA)>

Figure 14:
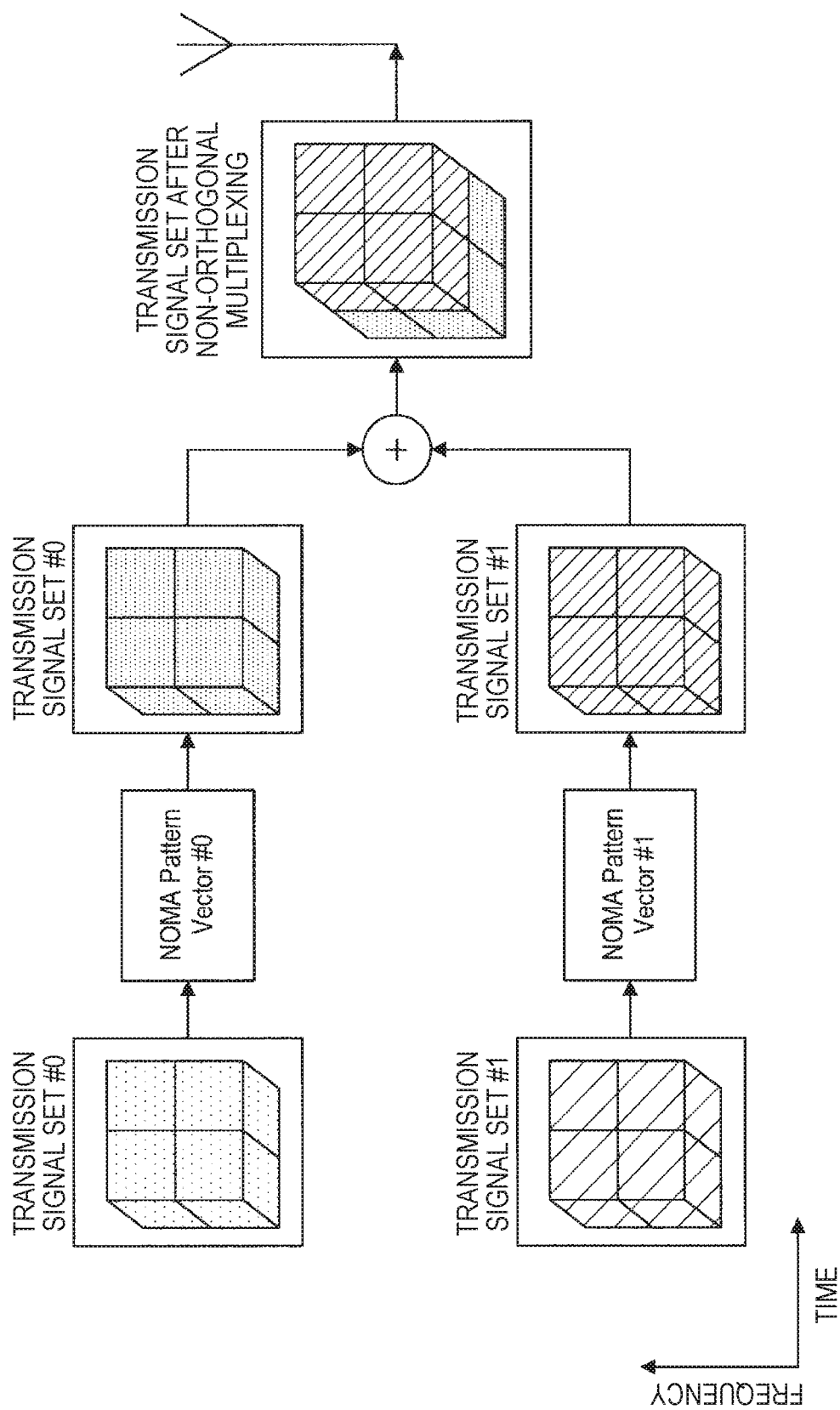
FIG. 14 is a diagram illustrating an example of non-orthogonally multiplexed transmission signal processing according to the present embodiment.

In orthogonal multiple access (OMA), transmission and reception are performed by using a frequency axis and a time axis that intersect at right angles, for example. At this time, a frame configuration of frequency and time resources is decided by a sub carrier interval, and it is not possible to use resources that is equal to or greater than the number of resource elements as illustrated in FIG. 6. Meanwhile, a frame configuration is decided by adding an Interleave pattern V axis, a Spreading Pattern axis, a Scrambling Pattern axis, a Codebook axis, a Power axis, and the like, for example, that are non-orthogonal axes in addition to the frequency axis and the time axis that intersect at right angles. For example, FIG. 14 illustrates a case in which transmission signals are multiplexed with non-orthogonal axes in a transmission device and all resources multiplexed with the non-orthogonal axes are the same parameter set. Here, the transmission device represents either the base station device 1 or the terminal device 2. The transmission device prepares a plurality of transmission signal sets to be multiplexed. In FIG. 14, two transmission signal sets are assumed to be multiplexed. Although the number of transmission signal sets is two here, the number of transmission signal sets may be three or more. Also, the respective transmission signal sets may be transmission signals directed to different reception devices or may be transmission signals directed to the same reception device. Here, the reception device represents either the base station device 1 or the terminal device 2. Corresponding NOMA pattern vectors are applied to the respective transmission signal sets. Here, Interleave Pattern, Spreading Pattern, Scrambling Pattern, Codebook, Power Allocation, and the like are included in NOMA Pattern Vector, for example. Signals after the application of NOMA Pattern Vector are multiplexed on the same frequency and time resources and are then sent to the same antenna port. Also, although the transmission signal sets of the same parameter sets are multiplexed in FIG. 14, transmission signal sets of different parameter sets may be multiplexed.

Figure 15:
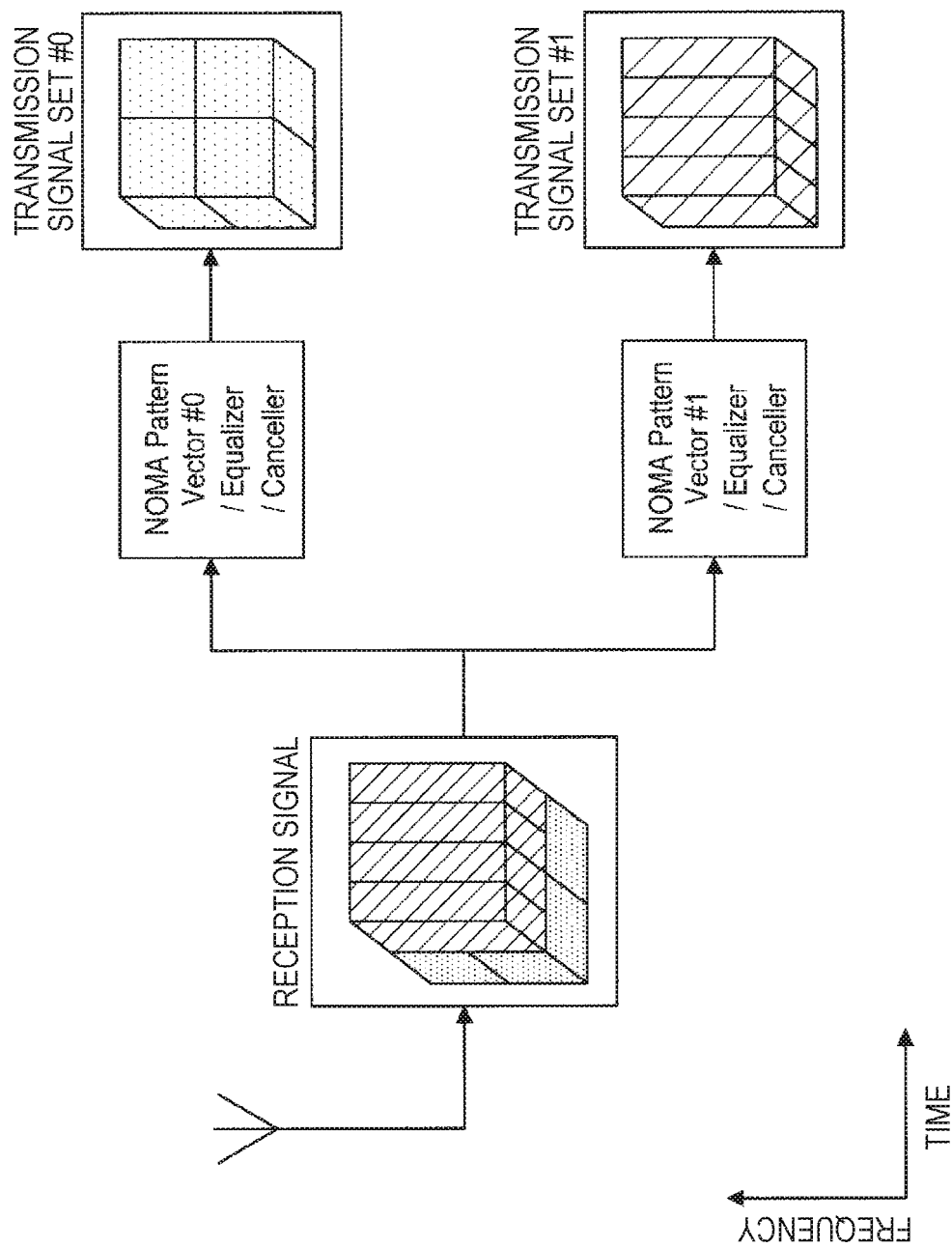
FIG. 15 is a diagram illustrating an example of non-orthogonally multiplexed reception signal processing according to the present embodiment.

FIG. 15 illustrates an example of the reception device. As illustrated in FIG. 15, a reception signal is received in a state in which a plurality of transmission signals is multiplexed on the same frequency and time resources. The reception device applies NOMA Pattern Vector applied by a transmitter in order to decode the multiplexed transmission signal set and extracts a desired signal through channel equalization and an interference signal canceller. In a case in which the multiplexing has been performed using the same NOMA Pattern Vector at this time, an influence of interference between the multiplexed signals increases, and it becomes difficult to perform the decoding.

As described above, NOMA Pattern Vector applied by the transmission device and the reception device needs to be shared between the transmission device and the reception device in NOMA transmission and to be applied without overlapping.

<<2. Technical Features>>
<2.1. Configuration Example of Higher Layer Processing Unit>

First, more detailed configuration examples of the base station device 1 and the terminal device 2 according to the present embodiment will be described with reference to FIGS. 16 and 17.

Figure 16:
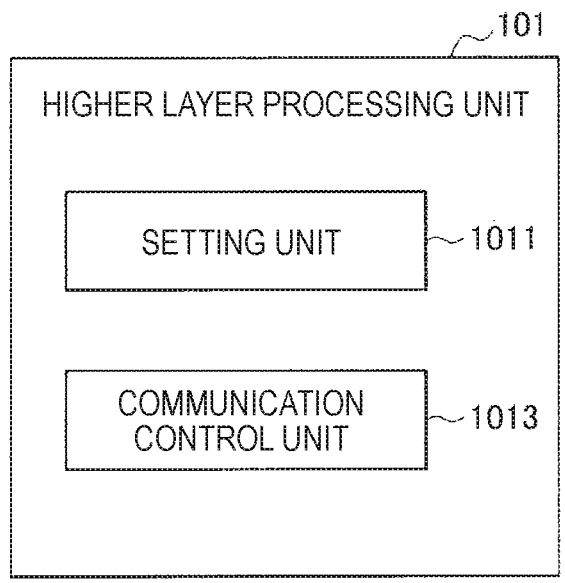
FIG. 16 is a block diagram illustrating an example of a theoretical configuration of a control unit of a base station device according to the present embodiment.

FIG. 16 is a block diagram illustrating an example of a theoretical configuration of the higher layer processing unit 101 of the base station device 1 according to the present embodiment. As illustrated in FIG. 16, the higher layer processing unit 101 of the base station device 1 according to the present embodiment includes a setting unit 1011 and a communication control unit 1013. The setting unit 1011 has a function of setting a control mode of the communication control unit 1013. The communication control unit 1013 has a function of controlling communication with the terminal device 2 on the basis of setting performed by the setting unit 1011. Functions of the setting unit 1011 and the communication control unit 1013 will be described later in detail.

Figure 17:
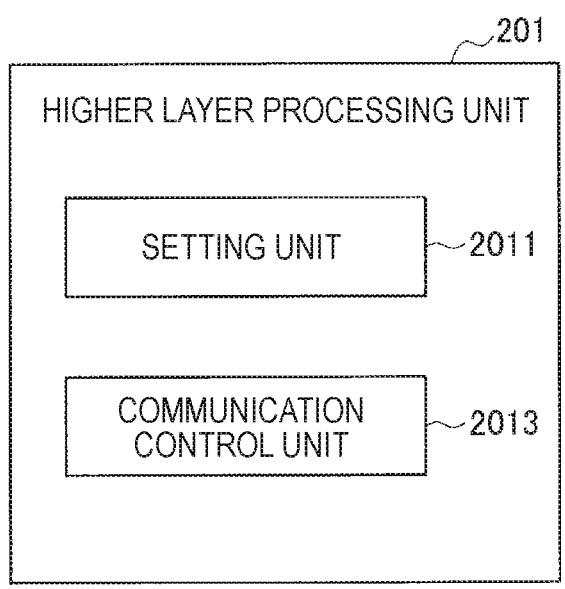
FIG. 17 is a block diagram illustrating an example of a theoretical configuration of a control unit of a terminal device according to the present embodiment.

FIG. 17 is a block diagram illustrating an example of a theoretical configuration of the higher layer processing unit 201 of the terminal device 2 according to the present embodiment. As illustrated in FIG. 17, the higher layer processing unit 201 of the terminal device 2 according to the present embodiment includes a setting unit 2011 and a communication control unit 2013. The setting unit 2011 has a function of setting a control mode of the communication control unit 2013. The communication control unit 2013 has a function of controlling communication with the base station device 1 on the basis of setting performed by the setting unit 2011. Functions of the setting unit 2011 and the communication control unit 2013 will be described later in detail.

Note that each of the higher layer processing unit 101 and the higher layer processing unit 201 may be realized as a processor, a circuit, an integrated circuit, or the like.

<2.2. Frame Configuration of NR>

In NR, a suitable frame configuration can be employed in accordance with supported use cases. The frame configuration includes a configuration for downlink transmission and uplink transmission corresponding to the downlink transmission.

Figure 18:
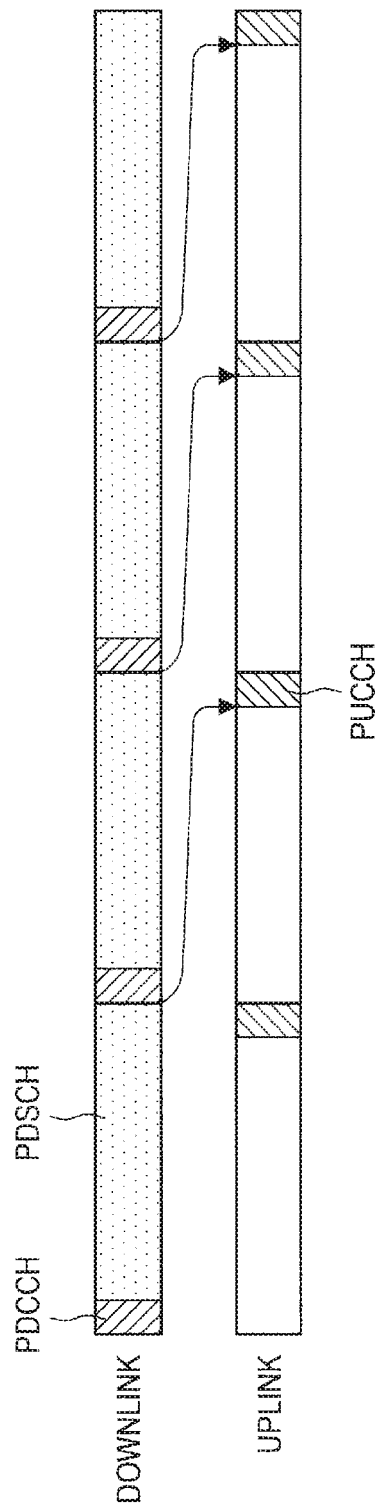
FIG. 18 is a diagram illustrating a configuration example of non-self-contained sub frames in a case of PDSCH transmission.

FIG. 18 illustrates a configuration example of non-self-contained sub frames in a case of PDSCH transmission. FIG. 18 illustrates four sub frames in downlink and uplink. In the downlink, the respective sub frames include PDCCH and PDSCH. In the uplink, the respective sub frames include PUCCH. The PDCCH is transmitted with information related to scheduling of the PDSCH in the sub frame or in a following sub frame included therein. The PUCCH is transmitted with information for reporting HARQ-ACK for the PDSCH transmitted in a downlink sub frame before the uplink sub frame included therein.

Note that, although the HARQ-ACK for the PDSCH in the immediately previous subframe is reported by the PUCCH in FIG. 18, the HARQ-ACK is not limited thereto and can be reported by the PUCCH in a sub frame later than the sub frame for receiving the PDSCH by a predetermined number. The predetermined number may be defined in advance or may be set uniquely to the terminal or uniquely to the base station.

Figure 19:
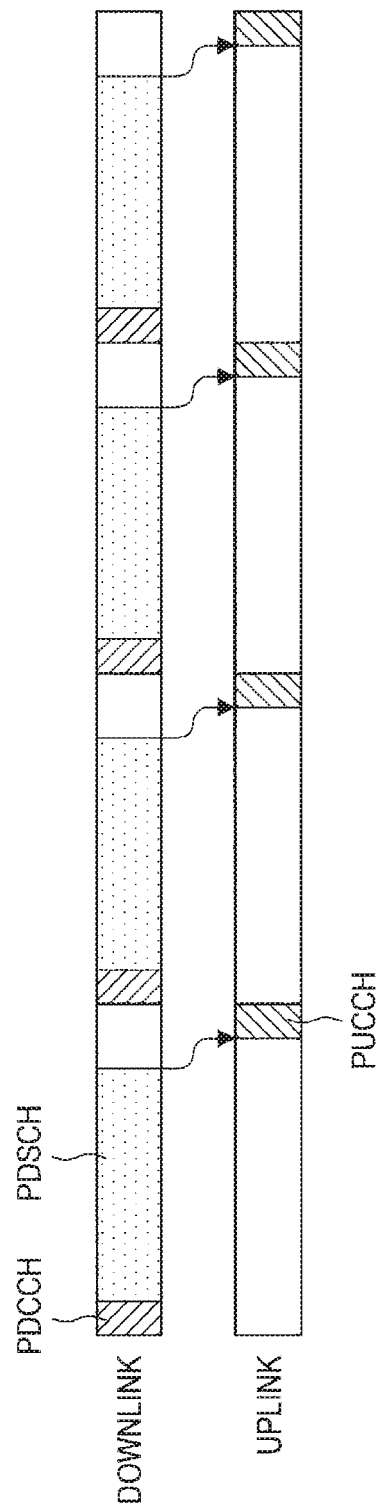
FIG. 19 is a diagram illustrating a configuration example of self-contained sub frames in a case of PDSCH transmission.

FIG. 19 illustrates a configuration example of self-contained sub frames in a case of PDSCH transmission. FIG. 19 illustrates four sub frames in downlink and uplink. In the downlink, the respective sub frames include PDCCH and PDSCH. In the uplink, the respective sub frames include PUCCH. The PDCCH is transmitted with information related to scheduling of the PDSCH in the sub frame or a following sub frame included therein. The PUCCH is transmitted with information for reporting HARQ-ACK for the PDSCH transmitted in the downlink sub frame that is the same as the uplink sub frame included therein.

In the frame configuration in FIG. 19, a transmission time (last symbol) of the PDSCH is decided in consideration of a processing time required before the information for reporting the HARQ-ACK of the PDSCH is generated and a time (symbol) required to transmit the PUCCH.

Although the frame configuration illustrated in FIG. 18 and the frame configuration illustrated in FIG. 19 in the case of the PDSCH transmission (that is, in the case in which the PDCCH provides notification of PDSCH scheduling information) have been described above, various frame configurations can similarly be employed in a case of PUSCH transmission (that is, in a case in which the PDCCH provides a notification of PUSCH scheduling information).

Figure 20:
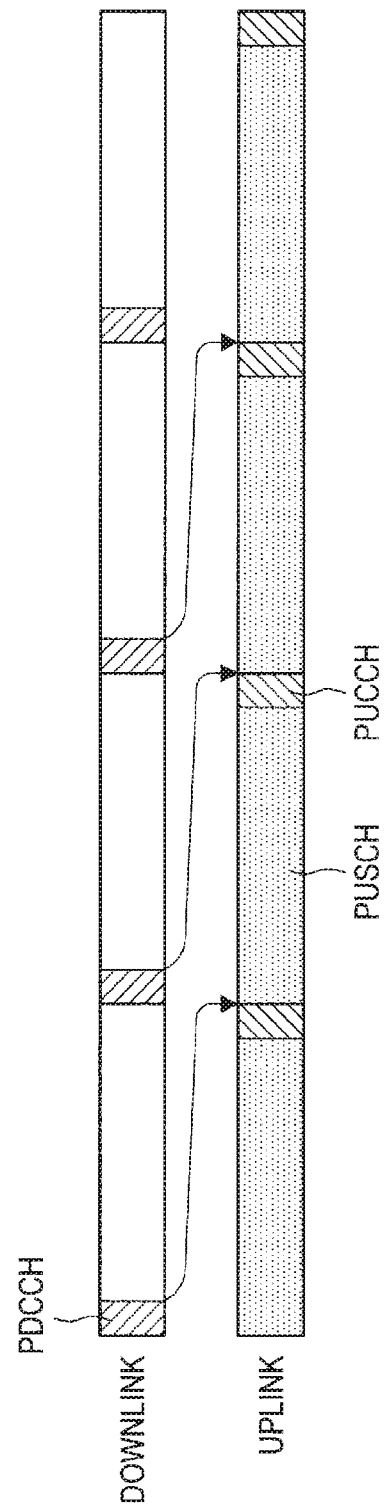
FIG. 20 is a diagram illustrating a configuration example of non-self-contained sub frames in a case of PUSCH transmission.

FIG. 20 illustrates a configuration example of non-self-contained sub frames in a case of PUSCH transmission. FIG. 20 illustrates four sub frames in downlink and uplink. In the downlink, the respective sub frames include PDCCH. In the uplink, the respective sub frames include PUCCH and PUSCH. The PDCCH is transmitted with information related to scheduling of PUSCH in an uplink sub frame following the sub frame included therein.

Note that, although the PUSCH is scheduled by the PDCCH in the immediately previous sub frame in FIG. 20, the PUSCH is not limited thereto and can be scheduled by PDCCH earlier than the uplink sub frame for transmitting the PUSCH by a predetermined number. The predetermined number may be defined in advance or may be set uniquely to the terminal or uniquely to the base station.

Figure 21:
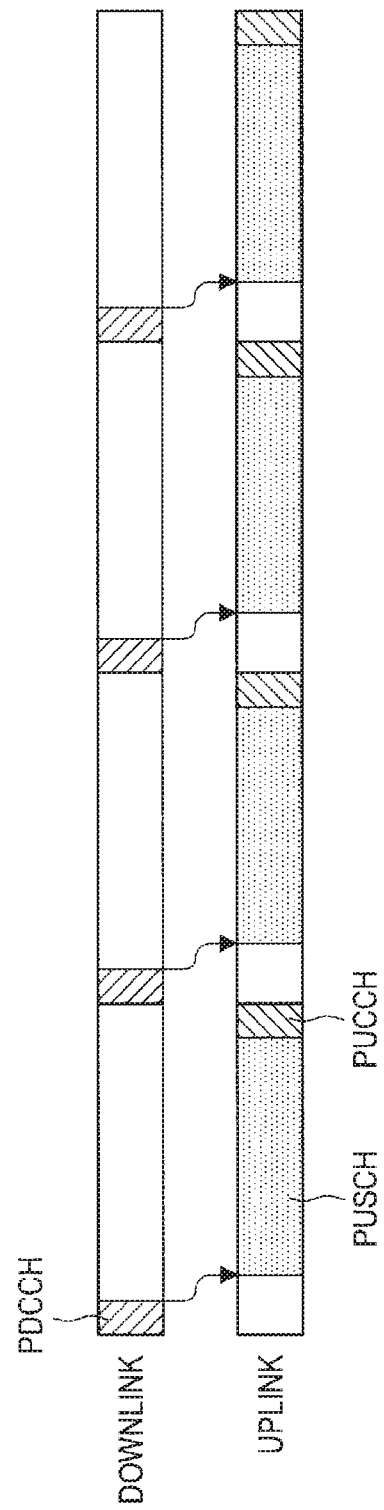
FIG. 21 is a diagram illustrating a configuration example of self-contained sub frames in a case of PUSCH transmission.

FIG. 21 illustrates a configuration example of self-contained sub frames in a case of PUSCH transmission. FIG. 21 illustrates four sub frames in downlink and uplink. In the downlink, the respective sub frames include PDCCH. In the uplink, the respective sub frames include PUCCH and PUSCH. The PDCCH is transmitted with information related to scheduling of the PUSCH in the uplink sub frame included therein.

In the frame configuration in FIG. 21, a transmission time (first symbol) of the PUSCH is decided in consideration of a processing time required before the PUSCH is generated on the basis of scheduling of the PDCCH and a time (symbol) required to transmit the PDCCH.

Note that although the case of the PDSCH transmission as illustrated in FIGS. 18 and 19 will be described in the following description, similar description can also be applied to the case of the PUSCH transmission as illustrated in FIGS. 20 and 21. Therefore, technologies and content in relation to the PDSCH transmission can be replaced with those in relation to the PUSCH transmission unless particularly indicated otherwise.

Also, the last symbol of the PDSCH occurs before the last symbol of its downlink sub frame in the frame configuration illustrated in FIG. 19. In its downlink sub frame, nothing may be transmitted or another downlink channel and/or a downlink signal may be transmitted as a symbol after the last symbol of the PDSCH (hereinafter, also referred to as a downlink GAP region).

For example, the downlink GAP region is used to map PBCH for transmitting a master information block (MIB), PDSCH for transmitting a system information block (SIB), or a channel for providing notifications to the plurality of terminal devices. Also, the downlink GAP region is used to transmit a synchronization signal such as PSS or SSS, a detection signal (discovery signal) used to perform RRM measurement, and CSI-RS used to perform CSI measurement, for example.

In addition, the first symbol of the PUSCH in the frame configuration illustrated in FIG. 21 occurs after the first symbol of its uplink sub frame. In its uplink sub frame, nothing may be transmitted or another uplink channel and/or an uplink signal may be transmitted as a symbol before the first symbol of the PUSCH (hereinafter, also referred to as an uplink GAP region).

For example, the uplink GAP region can be used to map sounding RS for measuring a transmission path state of the uplink, DMRS for the PUSCH transmitted in its uplink sub frame, PUCCH for transmitting predetermined uplink control information (UCI), PUCCH for reporting HARQ-ACK for PDSCH transmitted in the previous downlink sub frame, and the like.

In addition, although FIGS. 18 to 21 have been described as different drawings in the aforementioned description, these frame configurations can be used in combination with each other (at the same time). That is, it is possible to transmit a plurality of PDCCHs in a multiplexed manner by a predetermined method, and PDSCH transmission and/or PUSCH transmission is performed in accordance with downlink control information (DCI) provided by the PDCCHs as notifications.

For example, either a non-self-contained sub frame or a self-contained sub frame can be employed for both the PDSCH transmission and the PUSCH transmission. That is, FIGS. 18 and 20 can be used at the same time, and FIGS. 19 and 21 can be used at the same time.

Also, the non-self-contained sub frame or the self-contained sub frame can differ in each of the PDSCH transmission and the PUSCH transmission, for example. That is, FIGS. 18 and 21 can be used at the same time, and FIGS. 19 and 20 can be used at the same time.

Note that, since it is assumed that different frequency bands are used for LTE and NR, for example, collision of regions for transmitting HARQ-ACK between LTE and NR is avoided. Also, even if the used frequency bands overlap between LTE and NR, it is possible to avoid the collision by dividing regions for transmitting HARQ-ACK (using different RBs or the like, for example) between LTE and NR.

<2.3. Timing Control>

Communication apparatuses according to the embodiment can flexibly control a communication timing.

(1) First Mode and Second Mode

First, the communication apparatuses according to the embodiment, that is, the base station device 1 and the terminal device 2 control transmission of any one of a first channel that is transmitted in a first direction and a second channel that is transmitted in a second direction that faces the first direction and corresponds to the first channel and reception of the other one of the first channel and the second channel.

In relation to PDSCH transmission, the first direction is a downlink, the first channel is a data channel (for example, PDSCH), the second direction is an uplink, and the second channel is a control channel (for example, PUCCH). In addition, the base station device 1 (for example, the communication control unit 1013) controls transmission of PDSCH and reception of PUCCH. Also, the terminal device 2 (for example, the communication control unit 2013) controls transmission of PUCCH and reception of PDSCH. Here, PDSCH corresponds to PUCCH in a point that PUCCH includes HARQ-ACK for PDSCH.

In relation to transmission of PUSCH, the first direction is a downlink, the first channel is a control channel (for example, PDCCH), the second direction is an uplink, and the second channel is a data channel (for example, PUSCH). In addition, the base station device 1 (for example, the communication control unit 1013) controls transmission of PDCCH and reception of PUSCH. Also, the terminal device 2 (for example, the communication control unit 2013) controls transmission of PUSCH and reception of PDCCH. Here, PDCCH corresponds to PUSCH in a point that PUSCH is transmitted and received in accordance with scheduling information included in PDCCH.

In addition, the first direction and the second direction may be the respective directions that face each other in a side link. Also, the first direction and the second direction may be the respective directions that face each other in a link that is established in a device-to-device (D2D) communication or machine type communication (MTC).

In addition, the communication apparatus according to the embodiment sets a control mode for transmitting and receiving the aforementioned first channel and second channel to a first mode or a second mode. For example, the base station device 1 (for example, the setting unit 1011) provides a notification of setting information indicating which control mode is to be set for another communication apparatus (for example, the terminal device 2), which is a communication counterpart. Also, the terminal device 2 (for example, the setting unit 2011) sets a control mode on the basis of setting information provided as a notification from another communication apparatus (for example, the base station device 1), which is a communication counterpart. The setting information can include information that indicates a sub frame configuration (information that indicates a position of the last symbol of PDSCH in a self-contained sub frame, information that indicates a position of the first symbol of PUSCH, or the like), for example, in addition to information that indicates a control mode. Note that the notification of the setting information can be provided through various means. For example, the notification of the setting information may be statically or quasi-statically provided using RRC signaling or MAC signaling or may be dynamically provided using DCI.

The first mode is a control mode using the frame configuration illustrated in FIG. 18 or the frame configuration illustrated in FIG. 20. That is, the first mode is a control mode using a non-self-contained sub frame. The communication apparatus transmits and receives the first channel and the second channel in different sub frames in the first mode. In relation to FIG. 18, for example, the base station device 1 and the terminal device 2 transmit and receive PDSCH and transmit and receive PUCCH corresponding to the PDSCH in a sub frame immediately after a sub frame in which the PDSCH is included. In relation to FIG. 20, for example, the base station device 1 and the terminal device 2 transmit and receive PDCCH and transmit and receive PUSCH corresponding to the PDCCH in a sub frame immediately after a sub frame in which the PDCCH is included. Note that the sub frames described here are a type of frames and may be the same as or different from the sub frames in LTE.

The second mode is a control mode using a frame configuration illustrated in FIG. 19 or a frame configuration illustrated in FIG. 21. That is, the second mode is a control mode using a self-contained sub frame. The communication apparatus transmits and receives the first channel and the second channel in the same sub frame in the second mode. In relation to FIG. 19, for example, the base station device 1 and the terminal device 2 transmit and receive PDSCH and transmit and receive PUCCH corresponding to the PDSCH in the same (for example, the same frame number) sub frame as the sub frame in which the PDSCH is included. In relation to FIG. 21, for example, the base station device 1 and the terminal device 2 transmit and receive PDCCH and transmit and receive PUSCH corresponding to the PDCCH in the same sub frame as the sub frame in which the PDCCH is included.

Note that the same control mode or different control modes may be respectively set for the transmission of PDSCH and the transmission of PUSCH.

As described above, the communication timing as a target of control in the embodiment includes a transmission timing of the HARQ-ACK report corresponding to PDSCH as in the frame configuration illustrated in FIG. 18 or the frame configuration illustrated in FIG. 19. Also, the communication timing as a target of control in the embodiment includes a transmission timing of PUSCH that is scheduled with PDCCH as in the frame configuration illustrated in FIG. 20 or the frame configuration illustrated in FIG. 21.

Differences Between First Mode and Second Mode

Differences between the first mode (that is, the frame configuration illustrated in FIG. 18 or the frame configuration illustrated in FIG. 20) and the second mode (that is, the frame configuration illustrated in FIG. 19 or the frame configuration illustrated in FIG. 21) will be described.

A first difference relates to an interval between the first channel and the second channel. Specifically, the first difference relates to a time required to generate information for reporting HARQ-ACK for PDSCH after the PDSCH is received. Also, the first difference relates to a time required to generate uplink data for transmitting PUSCH scheduled with PDCCH after the PDCCH is received.

First, in the second mode, since one sub frame is completed with a report of PDSCH and HARQ-ACK included therein or PDCCH and PUSCH included therein, it is possible not to affect transmission and reception of other sub frames. In addition, in the second mode, since a processing time required before HARQ-ACK is generated after PDSCH is received or a processing time required before PUSCH is generated after PDCCH is received is shorter than that in the first mode, a processing burden of the terminal device 2 is relatively large.

Meanwhile, in the first mode, since the processing time required before HARQ-ACK is generated after PDSCH is received or the processing time required before PUSCH is generated after PDCCH is received is longer than that in the second mode, the processing burden of the terminal device 2 is relatively small. In addition, in the first mode, utilization of an uplink sub frame is decided in consideration of a sub frame for reporting HARQ-ACK or a sub frame for transmitting PUSCH.

Therefore, the control mode may be set uniquely to the terminal device 2 or uniquely to the base station device 1 in accordance with processing ability of the terminal device 2 or use cases or the like supported by the base station device 1.

The second difference relates to the last symbol of PDSCH and the first symbol of PUSCH.

First, PDSCH and PUCCH that includes HARQ-ACK for the PDSCH are transmitted in the same sub frame in the second mode. Therefore, the last symbol of PDSCH is decided on the basis of at least a processing time required to generate information for reporting HARQ-ACK for PDSCH and a time (symbol) to transmit PUCCH including HARQ-ACK. Therefore, the last symbol of PDSCH (that is, the first channel) is set at a position before the last symbol of a downlink sub frame in which the PDSCH is included in at least the second mode. Note that the last symbol of PDSCH may be statically or quasi-statically provided as a notification and set through RRC signaling, for example, or may be dynamically provided as a notification and set through DCI, for example.

In addition, PDCCH and PUSCH scheduled with the PDCCH are transmitted in the same sub frame in the second mode. Therefore, the first symbol of PUSCH is decided on the basis of at least a time (symbol) to transmit PDCCH and a processing time required to generate PUSCH including uplink data on the basis of the PDCCH. Therefore, the first symbol of PUSCH (that is, the second channel) is set at a position after the first symbol of the uplink sub frame in which the PUSCH is included in at least the second mode. Note that the first symbol of PUSCH may be statically or quasi-statically provided as a notification and set through RRC signaling, for example, or may be dynamically provided as a notification and set through DCI, for example.

Here, the last symbol of PDSCH and the first symbol of PUSCH may be respectively set uniquely to the terminal device 2 or uniquely to the base station device 1 in accordance with processing ability of the terminal device 2, a use case that the base station device 1 supports, or the like.

Meanwhile, PUCCH for reporting the HARQ report corresponding to PDSCH that is transmitted in a certain downlink sub frame is transmitted in an uplink sub frame after the downlink sub frame in the first mode. Therefore, the last symbol of PDSCH (that is, the first channel) can be set at the same position as that of the last symbol of the downlink sub frame in which the PDSCH is included in the first mode.

In addition. PUSCH that includes uplink data scheduled with PDCCH that is transmitted in a certain downlink sub frame is transmitted in an uplink sub frame after the downlink sub frame in the first mode. Therefore, the first symbol of PUSCH (that is, the second channel) can be set at the same position as that of the first symbol of the uplink sub frame in which the PUSCH is included in the first mode.

Flow of Processing

Figure 22:
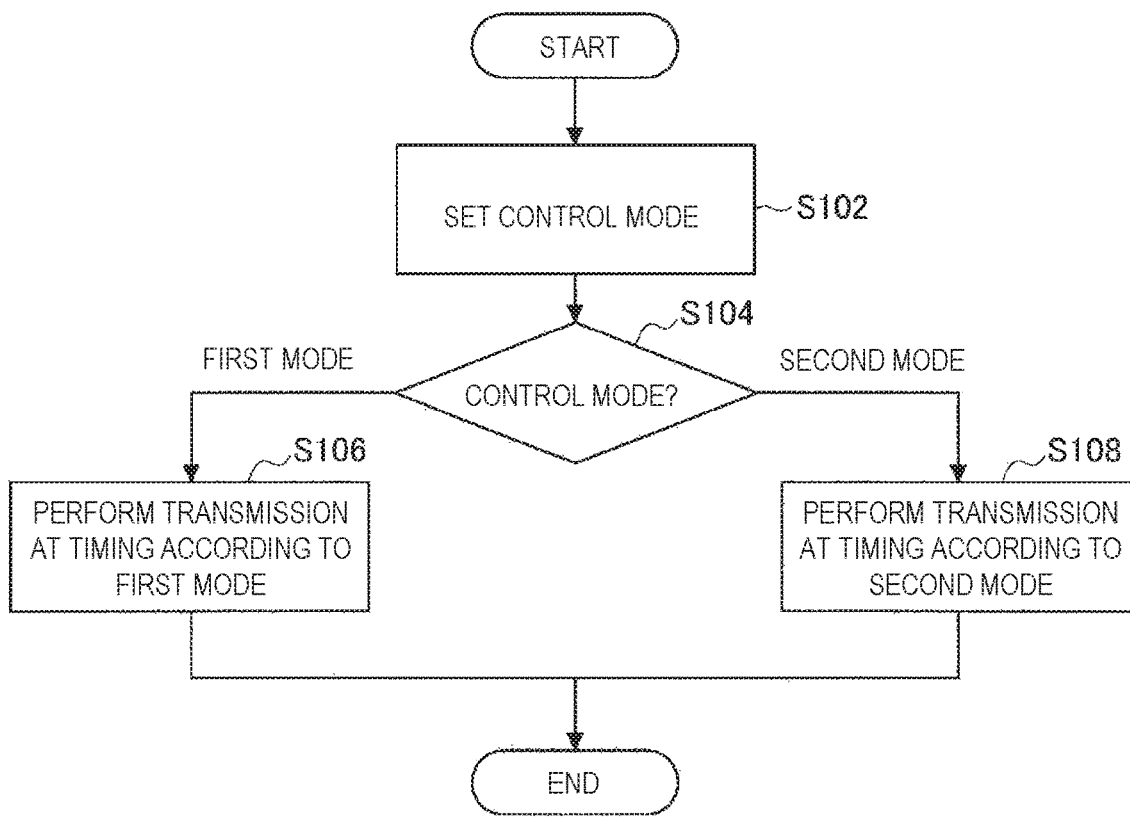
FIG. 22 is a flowchart illustrating an example of a flow of control mode setting processing that is executed in a terminal device according to the embodiment.

Hereinafter, an example of a flow of setting processing of the aforementioned control mode in the terminal device 2 will be described with reference to FIG. 22. FIG. 22 is a flowchart illustrating an example of a flow of setting processing of the control mode that is executed in the terminal device 2 according to the embodiment.

As illustrated in FIG. 22, the terminal device 2 sets the control mode to the first mode or the second mode first (Step S102). For example, the terminal device 2 sets the control mode to the first mode or the second mode in accordance with setting information received from the base station device 1 via RRC signaling.

Then, in a case in which the set control mode is the first mode (Step S104/first mode), the terminal device 2 performs transmission at a timing according to the first mode (Step S106). For example, the terminal device 2 transmits PUCCH corresponding to PDSCH in one of sub frames following a sub frame in which the received PDSCH is included. Also, the terminal device 2 transmits PUSCH scheduled with PDCCH in one of the sub frames following a sub frame in which the received PDCCH is included, for example.

Meanwhile, in a case in which the set control mode is the second mode (Step S104/second mode), the terminal device 2 perform transmission at a timing according to the second mode (Step S108). For example, the terminal device 2 transmits PUCCH corresponding to PDSCH in a sub frame that is the same as the sub frame in which the received PDSCH is included. Also, the terminal device 2 transmits PUSCH scheduled with PDCCH in a sub frame that is the same as the sub frame in which the received PDCCH is included, for example.

The processing ends with the aforementioned process.

The aforementioned processing may be individually performed for the respective cells or parameter sets. That is, the aforementioned control mode in the terminal device 2 can be individually set for the respective cells or parameter sets.

Terminal Ability Information

Here, there is a probability that the terminal device 2 that supports the second mode is required to have high processing ability since a processing time required before PUCCH or PUSCH is transmitted is short in the second mode. Therefore, the base station device 1 may be able to set the second mode in a case in which the terminal device 2 has high processing ability with which the terminal device 2 can support the second mode.

For example, the terminal device 2 provides, to the base station device 1, a notification of information that indicates the processing ability of the terminal device 2 itself, more specifically, terminal ability information (for example, UE capability information) that is information indicating whether or not the terminal device 2 supports the second mode. Then, the base station device 1 sets the control mode on the basis of the terminal ability information from the terminal device 2. For example, the terminal device 2 may set the first mode as long as setting information indicating that the second mode is to be set is not received from the base station device 1. Then, the terminal device 2 may set the second mode in a case in which the terminal device 2 has received the setting information indicating that the second mode is to be set from the base station device 1. Note that notifications of the terminal ability information as described above may be able to be individually provided for the respective parameter sets. Also, the terminal ability as described above may be defined as an essential function (mandatory function) for a predetermined parameter set.

A processing flow in that case will be described with reference to FIG. 23.

Figure 23:
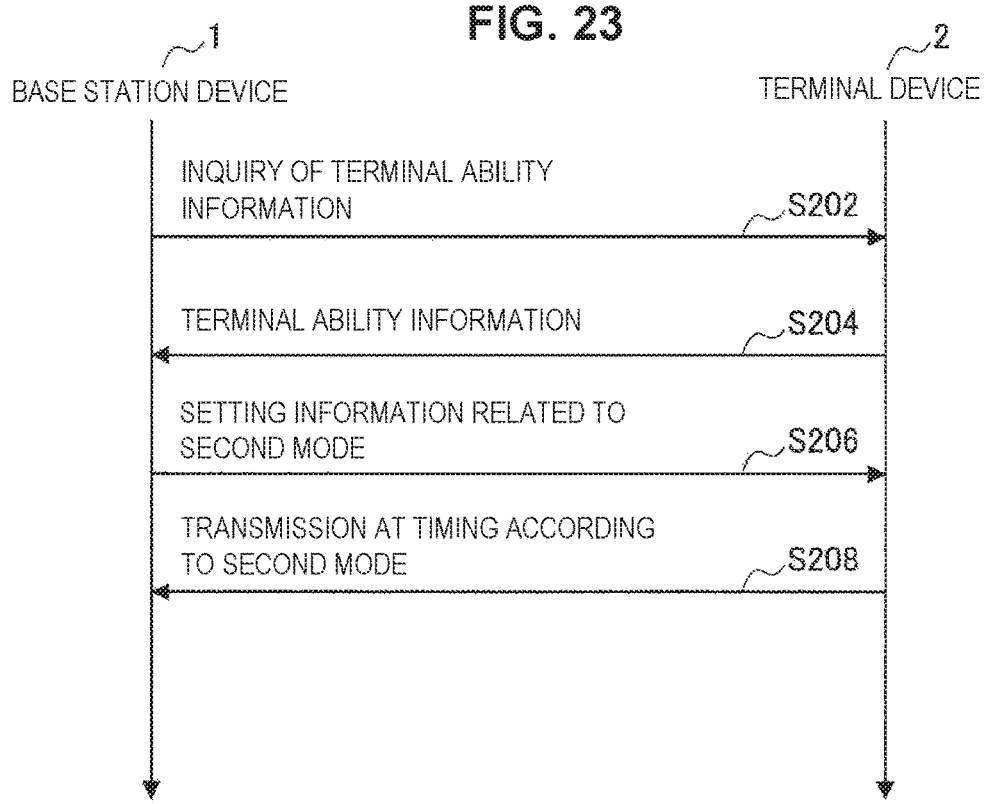
FIG. 23 is a sequence diagram illustrating an example of a flow of control mode setting processing that is executed in a wireless communication system according to the present embodiment.

FIG. 23 is a sequence diagram illustrating an example of a flow of control mode setting processing that is executed in the wireless communication system according to the present embodiment. The base station device 1 and the terminal device 2 are involved in the sequence.

As illustrated in FIG. 23, the base station device 1 transmits an inquiry for terminal ability information to the terminal device 2 first (Step S202). Next, the terminal device 2 transmits terminal ability information that includes information indicating whether or not the terminal device 2 supports the second mode to the base station device 1 (Step S204). In a case in which the terminal device 2 supports the second mode, then the base station device 1 transmits setting information indicating that the second mode is to be set to the terminal device 2 (Step S206). The messages described hitherto are transmitted and received in accordance with the first mode. Then, the terminal device 2 sets the second mode and performs transmission at a timing according to the second mode (Step S208).

(2) Variations of Setting Method

The terminal device 2 (for example, the setting unit 2011) can employ a variety of setting methods. For example, although the aforementioned description has been made on the assumption that a control mode is explicitly set with the notification of the setting information from the base station device 1 to the terminal device 2, the method of setting a control mode is not limited to such an example. For example, the control mode may be implicitly set on the basis of setting, a state, or the like of the base station device 1 or the terminal device 2.

Also, setting of a control mode may be regarded as switching between the first mode and the second mode.

In addition, the terminal device 2 may set a time required before setting of a control mode becomes valid. For example, the terminal device 2 may set a time required before setting becomes valid after the control mode is set to be a predetermined time or may be set separately. In addition, the time required before the setting becomes valid may be set in units of sub frames, for example.

Examples of Setting References

Hereinafter, examples of setting references of a control mode will be described.

For example, the control mode may be set in accordance with information of the terminal device 2. Specifically, the control mode may be set to the first mode or the second mode on the basis of whether or not a condition of the terminal device 2 is a predetermined condition, a state of the terminal device 2, an application that operates on the terminal device 2, a use case, and/or setting content.

For example, there may be default setting of the control mode, and the control mode may be switched as needed. Specifically, the first mode may be set as the control mode by default, and the second mode may be set in a case in which a predetermined condition is satisfied. The predetermined condition includes reception of setting information indicating that the second mode is to be set from the base station device 1, for example. For example, the terminal device 2 operates in the first mode until the second mode is set and operates in the second mode after the second mode is set.

For example, the control mode may be set in accordance with ability of the base station device 1. Specifically, the first mode is set as the control mode at the time of initial access from the terminal device 2, and the second mode may be set in a case in which connection to the base station device 1 that supports the second mode is established.

For example, the control mode may be set in accordance with an RRC state. Specifically, the first mode may be set as the control mode in the RRC connected state while the second mode may be set in an RRC idle state. In an opposite manner, the first mode may be set as the control mode in the RRC idle state while the second mode may be set in the RRC connected state.

For example, the control mode may be set in accordance with an access scheme. Specifically, the first mode may be set as the control mode in a case in which uplink transmission is performed by an orthogonal access scheme while the second mode may be set in a case in which uplink transmission is performed by a non-orthogonal access scheme. For example, the terminal device 2 sets usage of the orthogonal access scheme or the non-orthogonal access scheme on the basis of RRC signaling and implicitly sets the control mode in accordance with the setting.

For example, the control mode may be set in accordance with a type of a sub frame used. Specifically, the first mode may be set as the control mode in a case in which the non-self-contained sub frame is used while the second mode may be set in a case in which the self-contained sub frame is used. Also, parameters for individually deciding timing advance values for the case in which the non-self-contained sub frame is used and the case in which the self-contained sub frame is used may be set.

For example, the control mode may be set in accordance with a duplex scheme. Specifically, the first mode may be set as the control mode in the case of TDD while the second mode may be set in the case of FDD.

For example, the control mode may be set in accordance with an application or a use case. Specifically, the first mode may be set in a case of a first application or a first use case while the second mode may be set in a case of a second application or a second use case. For example, the first application or the first use case is an application or a use case of high-speed and broad-band communication while the second application or the second use case is an application or a use case of a low latency communication.

For example, the control mode may be set in accordance with a subcarrier interval. Specifically, the first mode may be set as the control mode in a case in which the sub carrier interval is equal to or less than a threshold value or is a first sub carrier interval while the second mode may be set in a case in which the sub carrier interval exceeds the threshold value or is a second sub carrier interval. Note that the threshold value may be 15 kHz that is a sub carrier interval in LTE, for example. Note that in a case in which the sub carrier interval is a part of a set parameter set, the control mode may be set in accordance with the parameter set.

For example, the control mode may be set in accordance with a transmission time interval (TTI) length. Specifically, the first mode may be set as the control mode in a case in which the TTI length is equal to or less than a threshold value or is a first TTI length while the second mode may be set in a case in which the TTI length exceeds the threshold value or is a second TTI length. Note that the threshold value may be 1 millisecond, for example. Note that the TTI length is a part of the set parameter set, the control mode may be set in accordance with the parameter set.

Note that the aforementioned setting references can be appropriately combined. For example, the control mode may be set in accordance with a combination of the RRC state and the access scheme. This is because the terminal device 2 can perform transmission without the timing advance that is performed for obtaining orthogonality in the RRC connected state in a case in which the non-orthogonal access scheme is used.

Also, although the specific examples of the cases in which the first mode is set and the cases in which the second mode is set have been described above, the first mode and the second mode may be set in an opposite manner in the respective specific examples.

Exceptional Processing

The terminal device 2 (for example, the setting unit 2011) may exceptionally switch the control mode under a predetermined condition even in a case in which the control mode is set on the basis of setting information from the base station device 1. The terminal device 2 may switch the control mode in a case in which a predetermined condition is satisfied, under a predetermined condition, in a case of transmission of a predetermined channel, and/or in a case of transmission of a predetermined signal, for example. For example, the terminal device 2 may switch the control mode to the first mode in any of the following cases even if the second mode has been set on the basis of the setting information from the base station device 1.

For example, the terminal device 2 may switch the control mode in accordance with a stage of access processing. For example, the terminal device 2 switches the control mode to the first mode when random access processing is performed.

For example, the terminal device 2 may switch the control mode in accordance with a type of a channel to be transmitted. For example, the terminal device 2 switches the control mode to the first mode when a random access channel is transmitted.

For example, the terminal device 2 may switch the control mode to the first mode in accordance with a size of data to be transmitted or received. Specifically, the terminal device 2 switches the control mode to the first mode in a case in which the size of data to be transmitted or received is greater than a threshold value. Here, the size of data can mean a transport block size or a size of a code word.

For example, the terminal device 2 may switch the control mode to the first mode in accordance with the number of resource blocks allocated and/or an order of a modulation scheme (modulation order). Specifically, the terminal device 2 switches the control mode to the first mode in a case in which the number of resource blocks allocated is greater than a threshold value and/or in a case in which the order of the modulation scheme is greater than a threshold value. This has a meaning that is similar to the switching in accordance with the size of data.

For example, the terminal device 2 may switch the control mode to the first mode in a case in which an explicit or implicit notification of setting the first mode by DCI is provided from the base station device 1. That is, the terminal device 2 sets statically or quasi-statically sets the second mode on the basis of a notification using RRC signaling and dynamically switch the control mode to the first mode on the basis of a notification using DCI.

For example, the terminal device 2 may switch the control mode to the first mode in accordance with a set value of the timing advance. Specifically, the terminal device 2 switches the control mode to the first mode in a case in which the set value of the timing advance is equal to or greater than a first threshold value or equal to or less than a second threshold value. Note that the first threshold value and the second threshold value may be the same or different from each other. Since the uplink transmission timing becomes earlier as the value of timing advance increases, this directly affects how long the processing time required before HARQ-ACK is generated after PDSCH is received, for example, is. Therefore, the terminal device 2 can secure a longer processing time by switching the control mode to the first mode in a case in which the processing time becomes excessively short.

For example, the terminal device 2 may switch the control mode to the first mode in accordance with RNTI used in scrambling a control channel (for example, PDCCH) of the downlink including scheduling information. Specifically, the terminal device 2 switches the control mode to the first mode in a case in which the control channel of the downlink including the scheduling information is scrambled using predetermined RNTI. Here, the predetermined RNTI is RNTI that is not unique to the terminal device 2. For example, the predetermined RNTI may be RNTI that is used to transmit notification information.

For example, the terminal device 2 may switch the control mode to the first mode in accordance with a searching space in which the control channel (for example, PDCCH) of the downlink including scheduling information is mapped. Specifically, the terminal device 2 switches the control mode to the first mode in a case in which the control channel of the downlink including the scheduling information is mapped in a predetermined searching space. Here, the predetermined searching space may be a common searching space, for example. The switching in accordance with the searching space is similar to switching in accordance with RNTI in using, as a reference, whether or not the control channel is directed to the terminal device 2 itself.

For example, the terminal device 2 may switch the control mode to the first mode in accordance with whether or not to perform multiple sub frame scheduling (multi TTI scheduling) for performing scheduling for a plurality of sub frames (TTI). Specifically, the terminal device 2 uses a second mode in a case in which single sub frame scheduling (single TTI scheduling) for performing scheduling for one sub frame is performed and uses a first mode in a case in which multiple sub frame scheduling is performed.

Note that the aforementioned references of the exception processing can be appropriately combined. In addition, the first mode and the second mode may be the opposite in relation to the aforementioned references of the exception processing. That is, the first mode may be set on the basis of setting information, and the control mode may be exceptionally switched to the second mode on the basis of the aforementioned references.

<2.4. Details of PUCCH Configuration>

PUCCH is used to provide a notification of UCI. UCI includes HARQ-ACK, CSI, and SR. Also, a physical resource for mapping PUCCH can be shared by a plurality of terminal devices 2. That is, a plurality of PUCCHs can be multiplexed with the physical resource of PUCCH. PUCCH illustrated in FIGS. 18 to 21 may represent a physical resource of PUCCH, and other terminal device 2 can also transmit PUCCH with the physical resource, for example.

Hereinafter, details of a PUCCH configuration will be described.

A physical resource of an uplink control channel (for example, PUCCH) can be multiplexed with an uplink data channel (for example, PUSCH) in a frequency region or a time region in an uplink sub frame. This point will be described in detail later with reference to FIGS. 24 and 25. Note that the physical resource of PUCCH may form a logical resource of PUCCH for multiplexing a plurality of PUCCHs. For example, a physical resource of certain PUCCH forms a logical resource of a plurality of PUCCHs by a time, a frequency, a code, a space, an antenna port, or the like. The base station device 1 and the terminal device 2 can transmit and receive PUCCH using the logical resource of PUCCH (hereinafter, also simply referred to as a PUCCH resource).

Figure 24:
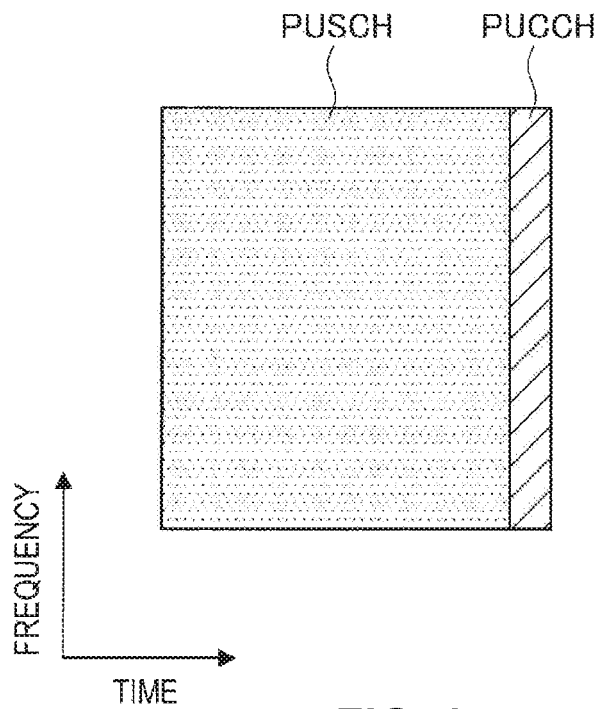
FIG. 24 is a diagram illustrating an example of a PUCCH configuration.

FIG. 24 is an example of the PUCCH configuration. In the example illustrated in FIG. 24, the physical resource of PUCCH is multiplexed with PUSCH in a time region. In the PUCCH configuration illustrated in FIG. 24, the physical resource of PUCCH is formed by a part of symbols in the uplink sub frame. Also, the physical resource of PUCCH may cover a system bandwidth in the uplink sub frame. In addition, the physical resource of PUCCH may be divided on the basis of predetermined units of the frequency region (for example, resource blocks or the like) in order to multiplex a plurality of PUCCHs in the frequency region. For example, the PUCCH configuration illustrated in FIG. 24 is suitable for the first mode (non-self-contained sub frame configuration) and the second mode (self-contained sub frame configuration).

Figure 25:
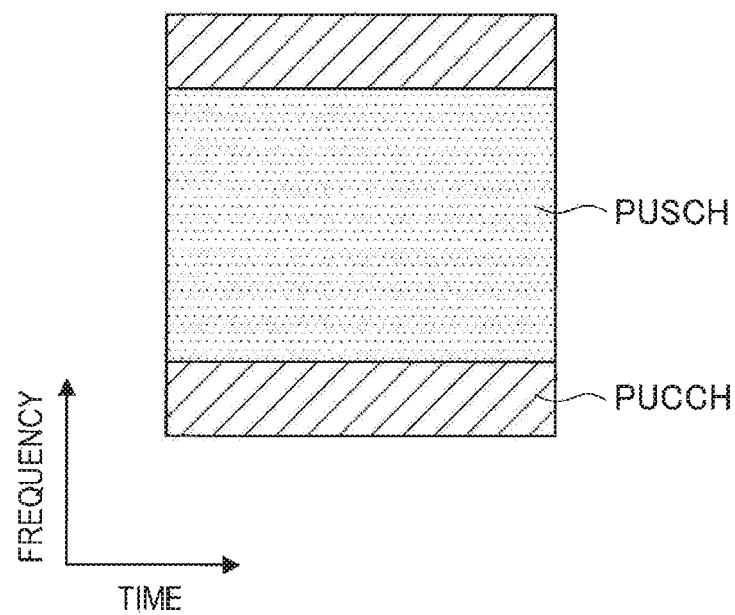
FIG. 25 is a diagram illustrating an example of a PUCCH configuration.

FIG. 25 is an example of the PUCCH configuration. In the example illustrated in FIG. 25, the physical resource of PUCCH is multiplexed with PUSCH in a frequency region. In the PUCCH configuration illustrated in FIG. 25, the physical resource of PUCCH is formed of a part of resource blocks in an uplink sub frame. Also, the physical resource of PUCCH may cover all symbols in the uplink sub frame. For example, the PUCCH configuration illustrated in FIG. 25 is suitable only for the first mode (non-self-contained sub frame configuration). This is because in the second mode, it is necessary to transmit PUCCH including HARQ-ACK for PDSCH, for example, in a sub frame that is the same as that of the PDSCH, that is, it is necessary to transmit PUCCH at a time after the sub frame.

For example, the PUCCH configurations illustrated in FIGS. 24 and 25 may be used in a switched manner on the basis of predetermined parameters, states, setting, and the like. For example, the PUCCH configuration illustrated in FIG. 25 is used in the case of the first mode while the PUCCH configuration illustrated in FIG. 24 is used in the case of the second mode. In addition, the PUCCH configuration illustrated in FIG. 24 or the PUCCH configuration illustrated in FIG. 25 is used on the basis of RRC signaling in the case of the first mode while the PUCCH configuration illustrated in FIG. 24 is used in the case of the second mode, for example.

<2.5. Supplementary Note>

Note that control of the transmission timing in the uplink has been described above, the present technology is not limited thereto. For example, the present technology can also be applied to control of a transmission timing in a side link. Here, the transmission timing in the side link is adjusted with reference to a timing reference frame. That is, the terminal device 2 performs transmission of the i-th wireless frame in the side link earlier or later than the corresponding i-th timing reference wireless frame as a reference by a predetermined timing advance time.

<<3. Application Examples>>

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

<3.1. Application Examples for Base Station>

(First Application Example)

Figure 26:
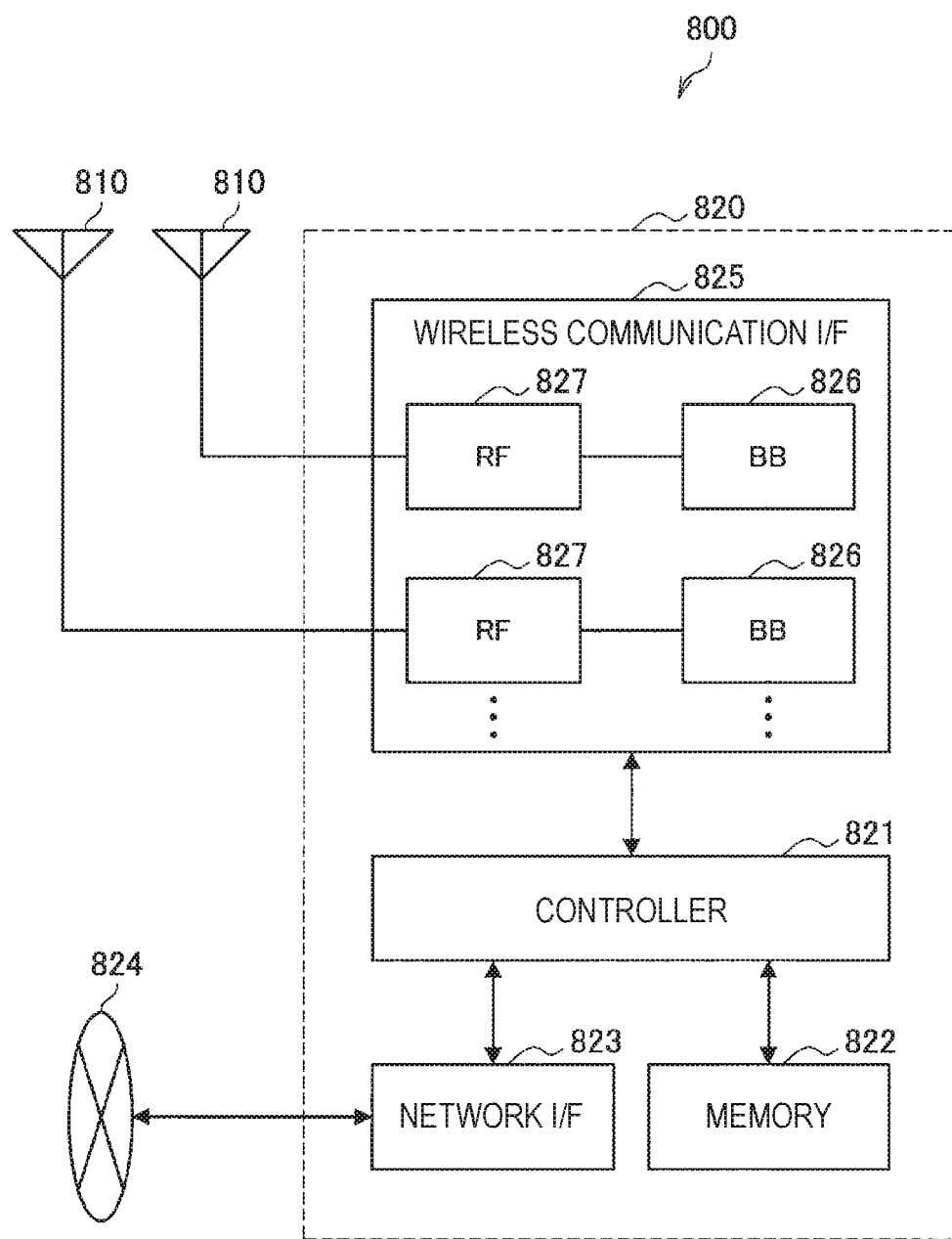
FIG. 26 is a block diagram illustrating a first example of a schematic configuration of an eNB.

FIG. 26 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 26, and the plurality of antennas 810 may, for example, correspond to a plurality of frequency bands used by the eNB 800. It should be noted that while FIG. 26 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 26, and the plurality of BB processors 826 may, for example, correspond to a plurality of frequency bands used by the eNB 800. Further, the wireless communication interface 825 may also include a plurality of the RF circuits 827, as illustrated in FIG. 26, and the plurality of RF circuits 827 may, for example, correspond to a plurality of antenna elements. Note that FIG. 26 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 26, one or more constituent elements (the setting unit 1011 and/or the communication control unit 1013) described with reference to FIG. 8 included in the higher layer processing unit 101 and/or the control unit 103 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station apparatus 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 26, the receiving unit 105 and the transmitting unit 107 described with reference to FIG. 8 may be implemented in the wireless communication interface 825 (for example, the RF circuit 827). Further, the transceiving antenna 109 may be implemented in the antenna 810.

(Second Application Example)

Figure 27:
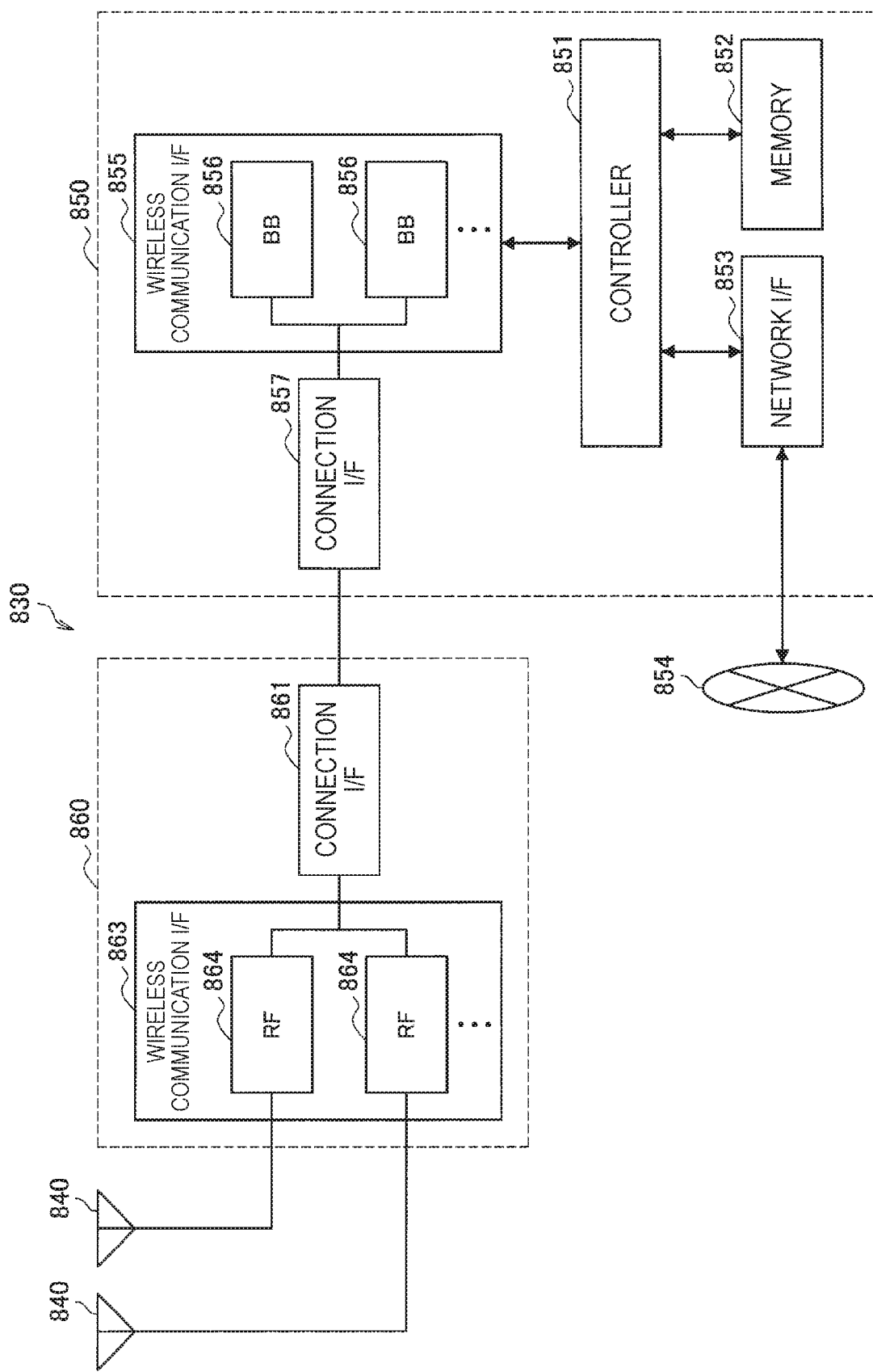
FIG. 27 is a block diagram illustrating a second example of the schematic configuration of the eNB.

FIG. 27 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 27, and the plurality of antennas 840 may, for example, correspond to a plurality of frequency bands used by the eNB 830. Note that FIG. 27 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 26.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 26 except that the BB processor 856 is connected to an RF circuit 864 of the RRH 860 via the connection interface 857. The wireless communication interface 855 may include a plurality of the BB processors 856, as illustrated in FIG. 27, and the plurality of BB processors 856 may, for example, correspond to a plurality of frequency bands used by the eNB 830. Note that FIG. 27 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 27, and the plurality of RF circuits 864 may, for example, correspond to a plurality of antenna elements. Note that FIG. 27 illustrates an example in which the wireless communication interface 863 includes the plurality of RF circuits 864, but the wireless communication interface 863 may include the single RF circuit 864.

In the eNB 830 illustrated in FIG. 27, one or more constituent elements (the setting unit 1011 and/or the communication control unit 1013) described with reference to FIG. 8 included in the higher layer processing unit 101 and/or the control unit 103 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 27, for example, the receiving unit 105 and the transmitting unit 107 described with reference to FIG. 8 may be implemented in the wireless communication interface 863 (for example, the RF circuit 864). Further, the transceiving antenna 109 may be implemented in the antenna 840.

<3.2. Application Examples for Terminal Device>
(First Application Example)

Figure 28:
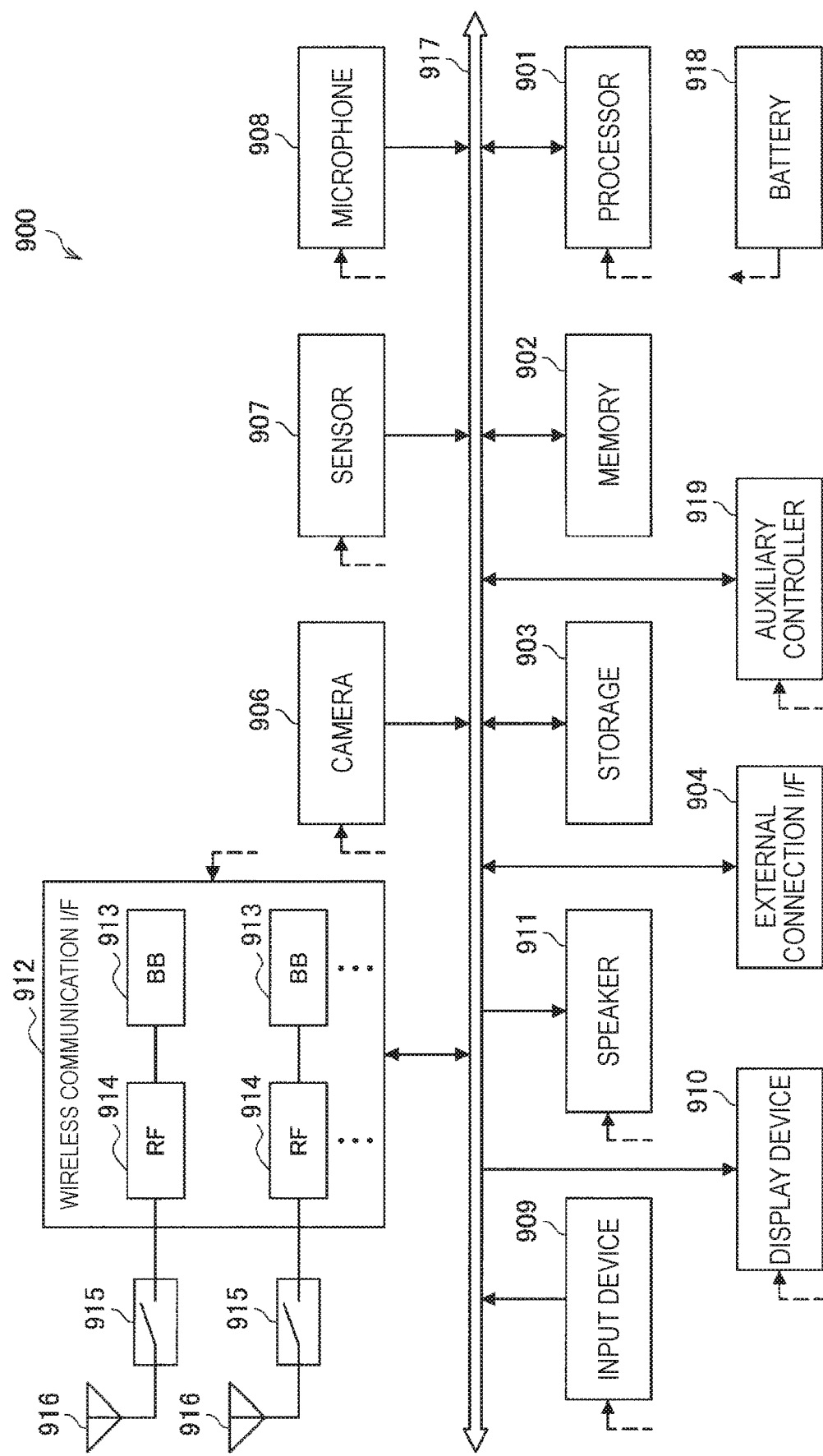
FIG. 28 is a block diagram illustrating an example of a schematic configuration of a smartphone.

FIG. 28 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 28. Note that FIG. 28 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 28. Note that FIG. 28 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 28 via a feeder line that is partially illustrated in the figure as a dashed line. The auxiliary controller 919, for example, operates a minimally necessary function of the smartphone 900 in a sleep mode.

In the smartphone 900 illustrated in FIG. 28, one or more constituent elements (the setting unit 2011 and/or the communication control unit 2013) included in the higher layer processing unit 201 and/or the control unit 203 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 28, for example, the receiving unit 205 and the transmitting unit 207 described with reference to FIG. 9 may be implemented in the wireless communication interface 912 (for example, the RF circuit 914). Further, the transceiving antenna 209 may be implemented in the antenna 916.

(Second Application Example)

Figure 29:
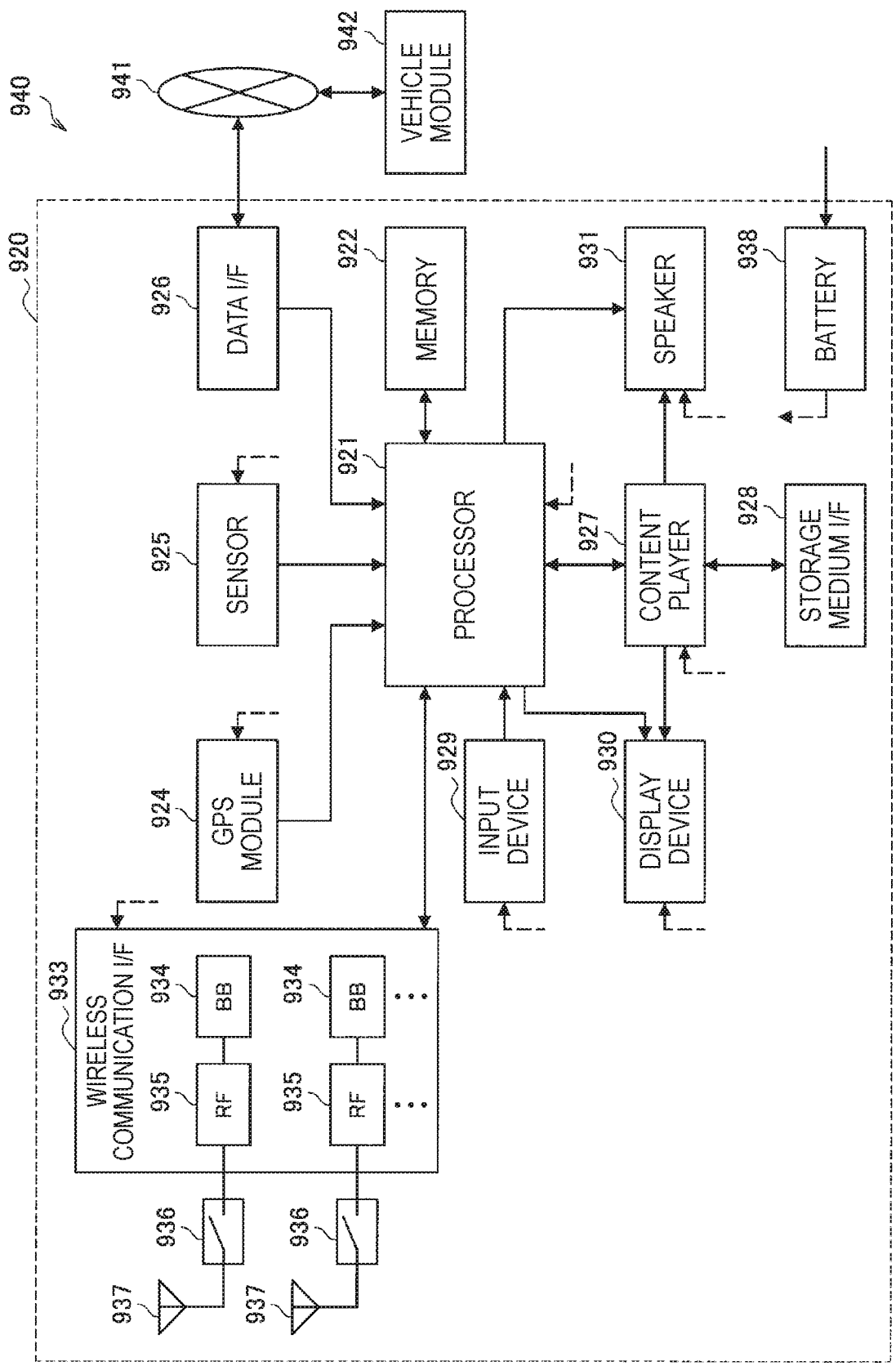
FIG. 29 is a block diagram illustrating an example of a schematic configuration of a car navigation apparatus.

FIG. 29 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 29. Note that FIG. 29 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 29. Note that FIG. 29 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 29 via a feeder line that is partially illustrated in the figure as a dashed line. Further, the battery 938 accumulates the electric power supplied from the vehicle.

In the car navigation apparatus 920 illustrated in FIG. 29, one or more constituent elements (the setting unit 2011 and the communication control unit 2013) included in the higher layer processing unit 201 and the control unit 203 described with reference to FIG. 9 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation apparatus 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation apparatus 920, and the wireless communication interface 933 (for example, the BB processor 934) and/or the processor 921 may execute the program. In this way, the car navigation apparatus 920 or the module may be provided as a device including the one or more constituent elements and a program causing the processor to function as the one or more constituent elements may be provided. In addition, a readable recording medium on which the program is recorded may be provided.

Further, in the car navigation apparatus 920 illustrated in FIG. 29, for example, the receiving unit 205 and the transmitting unit 207 described with reference to FIG. 9 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

<<4. Conclusion>>

The embodiment of the present disclosure has been described above in detail with reference to FIGS. 1 to 29. As described above, the base station device 1 and the terminal device 2 according to the embodiment controls transmission of any one of the first channel that is transmitted in the first direction and the second channel that is transmitted in the second direction that faces the first direction and corresponds to the first channel and reception of the other one of the first channel and the second channel. In addition, the base station device 1 and the terminal device 2 sets the control mode related to such communication to the first mode or the second mode. The base station device 1 and the terminal device 2 transmit and receive the first channel and the second channel in different sub frames in the first mode. Meanwhile, the base station device 1 and the terminal device 2 transmit and receive the first channel and the second channel in the same sub frame in the second mode. In this manner, the wireless communication system according to the embodiment supports the first mode and the second mode. In this manner, it is possible to achieve flexible design in relation to communication timings. Specifically, each communication apparatus included in the wireless communication system can flexibly select the transmission timing according to the first mode and the transmission timing according to the second mode. Also, it is possible to realize such flexible design and to thereby significantly improve transmission efficiency of the entire system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the processes described with reference to the flowcharts and the sequence diagrams in this specification are not necessarily executed in the order illustrated in the drawings. Several process steps may be executed in parallel. Further, an additional process step may be employed, or some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A communication apparatus including:
a communication control unit that controls transmission of any one of a first channel that is transmitted in a first direction and a second channel that is transmitted in a second direction that faces the first direction and corresponds to the first channel and reception of the other one of the first channel and the second channel; and
a setting unit that sets a control mode of the communication control unit to a first mode or a second mode,
in which the communication control unit transmits and receives the first channel and the second channel in different sub frames in the first mode and transmits and receives the first channel and the second channel in a same sub frame in the second mode.

(2)
The communication apparatus according to (1),
in which the first direction is a downlink, and the first channel is a data channel, and
the second direction is an uplink, and the second channel is a control channel.

(3)
The communication apparatus according to (2), in which a last symbol of the first channel is set at a position before a last symbol of a downlink sub frame in which the first channel is included in the second mode.

(4)
The communication apparatus according to (3), in which the last symbol of the first channel is set uniquely to a terminal device or uniquely to a base station.

(5)
The communication apparatus according to any one of (2) to (4), in which a last symbol of the first channel is set at a same position as a position of a last symbol of a downlink sub frame in which the first channel is included in the first mode.

(6)
The communication apparatus according to (1),
in which the first direction is a downlink, and the first channel is a control channel, and
the second direction is an uplink, and the second channel is a data channel.

(7)
The communication apparatus according to (6), in which a first symbol of the second channel is set at a position after a first symbol of an uplink sub frame in which the second channel is included in the second mode.

(8)
The communication apparatus according to (7), in which the first symbol of the second channel is set uniquely to a terminal device or uniquely to a base station.

(9)
The communication apparatus according to any one of (6) to (8), in which a first symbol of the second channel is set at a same position as a position of a first symbol of an uplink sub frame in which the second channel is included in the first mode.

(10)
The communication apparatus according to (1), in which the first direction and the second direction are the respective directions that face each other in a side link.

(11)
The communication apparatus according to any one of (1) to (10), in which the control mode is set to the first mode by default and is set to the second mode in a case in which a predetermined condition is satisfied.

(12)

The communication apparatus according to any one of (1) to (11), in which the control mode is set in accordance with a radio resource control (RRC) state.

(13)

The communication apparatus according to any one of (1) to (12), in which the control mode is set in accordance with a duplex scheme.

(14)

The communication apparatus according to any one of (1) to (13), in which the control mode is set in accordance with a sub carrier interval.

(15)

The communication apparatus according to any one of (1) to (14), in which the control mode is set in accordance with a transmission time interval (TTI) length.

(16)

The communication apparatus according to any one of (1) to (15), in which the setting unit sets the control mode on the basis of setting information that is provided as a notification from another communication apparatus, which is a communication counterpart.

(17)

The communication apparatus according to (16), in which the setting unit switches the control mode to the first mode in accordance with a type of a channel to be transmitted in a case in which the second mode is set on the basis of the setting information.

(18)

The communication apparatus according to (16) or (17), in which the setting unit switches the control mode to the first mode in accordance with a size of data transmitted or received in a case in which the second mode is set on the basis of the setting information.

(19)

The communication apparatus according to any one of (16) to (18), in which the setting unit switches the control mode to the first mode in accordance with a set timing advance value in a case in which the second mode is set on the basis of the setting information.

(20)

The communication apparatus according to any one of (16) to (19), in which the setting unit switches the control mode to the first mode in accordance with RNTI that is used for scrambling of a downlink control channel that includes scheduling information in a case in which the second mode is set on the basis of the setting information.

(21)

The communication apparatus according to (20), in which the setting unit switches the control mode to the first mode in a case in which the downlink control channel that includes the scheduling information has been scrambled using RNTI that is used to transmit notification information.

(22)

The communication apparatus according to any one of (16) to (21), in which the setting unit switches the control mode to the first mode in accordance with a searching space in which a downlink control channel that includes scheduling information is mapped in a case in which the second mode is set on the basis of the setting information.

(23)

The communication apparatus according to (22), in which the setting unit switches the control mode to the first mode in a case in which the downlink control channel that includes the scheduling information is mapped in a common searching space.

(24)

The communication apparatus according to any one of (1) to (23), in which the setting unit provides a notification of setting information that indicates which control mode is to be set for another communication apparatus, which is a communication counterpart.

(25)

The communication apparatus according to any one of (1) to (24), in which a physical resource of an uplink control channel is multiplexed with an uplink data channel in a frequency region or a time region in an uplink sub frame.

(26)

A communication method including:

controlling, by a processor, transmission of any one of a first channel that is transmitted in a first direction and a second channel that is transmitted in a second direction that faces the first direction and corresponds to the first channel and reception of the other one of the first channel and the second channel; and setting a control mode to a first mode or a second mode, in which the controlling of the transmission and the reception includes transmitting and receiving the first channel and the second channel in different sub frames in the first mode and transmitting and receiving the first channel and the second channel in a same sub frame in the second mode.

(27)

A recording medium having a program recorded thereon, the program causing a computer to function as:

a communication control unit that controls transmission of any one of a first channel that is transmitted in a first direction and a second channel that is transmitted in a second direction that faces the first direction and corresponds to the first channel and reception of the other one of the first channel and the second channel; and a setting unit that sets a control mode of the communication control unit to a first mode or a second mode, in which the communication control unit transmits and receives the first channel and the second channel in different sub frames in the first mode and transmits and receives the first channel and the second channel in a same sub frame in the second mode.

REFERENCE SIGNS LIST 1 base station device
101 higher layer processing unit
1011 setting unit
1013 communication control unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
2011 setting unit
2013 communication control unit
203 control unit
205 receiving unit 2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A communication apparatus comprising:
a communication controller including communications circuitry that:
controls reception of a first channel, and
controls transmission of a second channel corresponding to the first channel; and
a processor that:
is configured with a set of switching parameters,
wherein the configured set of switching parameters includes each of:
a type of the second channel to be transmitted,
a size of data to be transmitted or received,
a set timing advance value,
a radio network temporary identifier (RNTI) that is used for scrambling of a downlink control channel that includes scheduling information, and
a search space in which a downlink control channel that includes scheduling information is mapped,
sets a control mode of the communication controller to a first mode or a second mode based on setting information that is provided from a base station, and
based on the control mode being set to the second mode, based on an occurrence of a predetermined condition, compares the predetermined condition to the configured set of switching parameters and switches the control mode to the first mode in accordance with at least one switching parameter from the configured set of switching parameters,
wherein a processing time of the first channel in the first mode after receiving the first channel and before generating the second channel is longer than a processing time of the first channel in the second mode after receiving the first channel and before generating the second channel.

2. The communication apparatus according to claim 1, wherein the first channel is a data channel, and
the second channel is a control channel.

3. The communication apparatus according to claim 2, wherein a last symbol of the first channel is set at a position before a last symbol of a downlink sub frame in which the first channel is included in the second mode.

4. The communication apparatus according to claim 3, wherein the last symbol of the first channel is set uniquely to a terminal device or uniquely to a base station.

5. The communication apparatus according to claim 2, wherein a last symbol of the first channel is set at a same position as a position of a last symbol of a downlink sub frame in which the first channel is included in the first mode.

6. The communication apparatus according to claim 1, wherein the first channel is a control channel, and
the second channel is a data channel.

7. The communication apparatus according to claim 6, wherein a first symbol of the second channel is set at a position after a first symbol of an uplink sub frame in which the second channel is included in the second mode.

8. The communication apparatus according to claim 7, wherein the first symbol of the second channel is set uniquely to a terminal device or uniquely to a base station.

9. The communication apparatus according to claim 6, wherein a first symbol of the second channel is set at a same position as a position of a first symbol of an uplink sub frame in which the second channel is included in the first mode.

10. The communication apparatus according to claim 1, wherein the first channel and the second channel are side link channels.

11. The communication apparatus according to claim 1, wherein the control mode is initially set to the first mode by default and is set to the second mode in a case in which a predetermined condition is satisfied.

12. The communication apparatus according to claim 1, wherein the control mode is set in accordance with a radio resource control (RRC) state.

13. The communication apparatus according to claim 1, wherein the control mode is set in accordance with a duplex scheme.

14. The communication apparatus according to claim 1, wherein the control mode is set in accordance with a sub carrier interval.

15. The communication apparatus according to claim 1, wherein the control mode is set in accordance with a transmission time interval (TTI) length.

16. The communication apparatus according to claim 1, wherein the processor switches the control mode from the second mode to the first mode in a case in which the downlink control channel that includes the scheduling information is mapped in a common searching space.

17. The communication apparatus according to claim 1, wherein the processor provides a notification of setting information that indicates which control mode is to be set by the base station.

18. The communication apparatus according to claim 1, wherein a physical resource of an uplink control channel is multiplexed with an uplink data channel in a frequency region or a time region in an uplink sub frame.

19. The communication apparatus according to claim 1, wherein the first mode comprises receiving a PDSCH in a first sub frame and transmitting a corresponding HARQ-ACK in a second sub frame contiguous in time with the first sub frame, and
wherein the second mode comprises receiving the PDSCH in the first sub frame and transmitting the corresponding HARQ-ACK in the first subframe.

20. The communication apparatus according to claim 1, wherein the first mode comprises receiving a PDCCH in a first sub frame and transmitting a corresponding PUSCH in a second sub frame contiguous in time with the first sub frame, and
wherein the second mode comprises receiving the PDCCH in the first sub frame and transmitting the corresponding PUSCH in the first sub frame.

21. The communication apparatus of claim 1:
wherein the configured set of switching parameters further includes each of:
a stage of access processing of the second channel,
a number of resource blocks allocated for the second channel,
an order of a modulation scheme,
an explicit or implicit notification of setting of the first mode by downlink control information (DCI), and multiple sub frame scheduling for performing scheduling for a plurality of sub frames.

22. A communication method by a communication device that includes a transceiver and a processor, the method comprising:
configuring the processor with a set of switching parameters,
wherein the configured set of switching parameters includes each of:
a type of a second channel to be transmitted,
a size of data to be transmitted or received,
a set timing advance value,
a radio network temporary identifier (RNTI) that is used for scrambling of a downlink control channel that includes scheduling information, and
a search space in which a downlink control channel that includes scheduling information is mapped,
receiving a first channel;
transmitting the second channel corresponding to the first channel;
setting a control mode to a first mode or a second node based on setting information that is provided from a base station; and
based on the control mode being set to the second mode, based on an occurrence of a predetermined condition, comparing the predetermined condition to the configured set of switching parameters and switching the control mode to the first mode in accordance with at least one switching parameter from the configured set of switching parameters,
wherein a processing time of the first channel in the first mode after receiving the first channel and before generating the second channel is longer than a processing time of the first channel in the second mode after receiving the first channel and before generating the second channel.

23. The method according to claim 22,
wherein the first mode comprises receiving a PDSCH in a first sub frame and transmitting a corresponding HARQ-ACK in a second sub frame contiguous in time with the first sub frame, and
wherein the second mode comprises receiving the PDSCH in the first sub frame and transmitting the corresponding HARQ-ACK in the first subframe.

24. The method according to claim 22,
wherein the first mode comprises receiving a PDCCH in a first sub frame and transmitting a corresponding PUSCH in a second sub frame contiguous in time with the first sub frame, and
wherein the second mode comprises receiving the PDCCH in the first sub frame and transmitting the corresponding PUSCH in the first sub frame.

25. The method of claim 22:
wherein the configured set of switching parameters further includes each of:

a stage of access processing of the second channel,
a number of resource blocks allocated for the second channel,
an order of a modulation scheme,
an explicit or implicit notification of setting of the first mode by downlink control information (DCI), and
multiple sub frame scheduling for performing scheduling for a plurality of sub frames.

26. The non-transitory computer readable medium of claim 22:
wherein the configured set of switching parameters further includes each of:
a stage of access processing of the second channel,
a number of resource blocks allocated for the second channel,
an order of a modulation scheme,
an explicit or implicit notification of setting of the first mode by downlink control information (DCI), or
multiple sub frame scheduling for performing scheduling forr a plurality of sub frames.

27. A non-transitory computer readable medium having a program recorded thereon, the program capable of causing a device to execute a method comprising:
configuring a processor of the device with a set of switching parameters,
wherein the configured set of switching parameters includes each of:
a type of a second channel to be transmitted,
a size of data to be transmitted or received,
a set timing advance value,
a radio network temporary identifier (RNTI) that is used for scrambling of a downlink control channel that includes scheduling information, and
a search space in which a downlink control channel that includes scheduling information is mapped,
receiving a first channel;
transmitting the second channel corresponding to the first channel;
setting a control mode to a first mode or a second mode based on setting information that is provided from a base station; and
based on the control mode being set to the second mode, based on an occurrence of a predetermined condition, comparing the predetermined condition to the configured set of switching parameters and switching the control mode to the first mode in accordance with at least one switching parameter from the configured set of switching parameters,
wherein a processing time of the first channel in the first mode after receiving the first channel and before generating the second channel is longer than a processing time of the first channel in the second mode after receiving the first channel and before generating the second channel.

* * * * *